United States Patent
Ghodrat et al.

(10) Patent No.: US 6,266,723 B1
(45) Date of Patent: Jul. 24, 2001

(54) METHOD AND SYSTEM FOR OPTIMIZING OF PERIPHERAL COMPONENT INTERCONNECT PCI BUS TRANSFERS

(75) Inventors: Fataneh F. Ghodrat, Fort Collins, CO (US); Leslie Abraham, Garland, TX (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/280,093

(22) Filed: Mar. 29, 1999

(51) Int. Cl.[7] .................................................. G06F 13/00
(52) U.S. Cl. ............................ 710/100; 710/1; 710/33; 709/100; 712/300
(58) Field of Search .................... 710/1, 20, 21, 710/33, 34, 35, 65, 66, 100, 126, 128, 105; 709/100, 104, 105; 712/300

(56) References Cited

U.S. PATENT DOCUMENTS

| | | | |
|---|---|---|---|
| 5,255,378 | 10/1993 | Crawford et al. | 395/325 |
| 5,517,670 | 5/1996 | Allen et al. | 395/850 |
| 5,579,530 | 11/1996 | Solomon et al. | 395/855 |
| 5,581,714 | 12/1996 | Amini et al. | 395/308 |
| 5,664,230 | 9/1997 | Leyrer et al. | 395/886 |
| 5,669,014 | 9/1997 | Iyengar et al. | 395/842 |
| 5,689,660 | 11/1997 | Johnson et al. | 395/309 |
| 5,715,476 | 2/1998 | Kundu et al. | 395/855 |
| 5,727,233 | 3/1998 | Lynch et al. | 395/885 |
| 5,802,323 | 9/1998 | Bujanos et al. | 395/287 |
| 5,809,514 | 9/1998 | Nasserbakht et al. | 711/3 |
| 5,813,036 | 9/1998 | Ghosh et al. | 711/146 |
| 6,057,862 | * 5/2000 | Margulis | 710/132 |

* cited by examiner

*Primary Examiner*—Xuan M. Thai
(74) *Attorney, Agent, or Firm*—Carstens, Yee & Cahoon L.L.P.

(57) ABSTRACT

A method for optimizing bus transactions in a data processing system is provided. A bus transaction optimizer receives an original bus transaction request which includes an original start address of a target memory for the original bus transaction, an original byte size for a number of bytes for the original bus transaction, and an original bus command for the original bus transaction. The bus transaction optimizer generates multiple bus transaction requests in response to a determination that the original byte size is greater than or equal to a predetermined multiple transfer byte size data value. The multiple bus transaction requests may include at least one high-performance bus transaction request and at least one low-performance bus transaction request. If the original start address is not aligned on a cacheline boundary, the multiple bus transaction requests include a low-performance bus transaction request with an optimized start address equal to the original start address and a high-performance bus transaction request with an optimized start address equal to a cacheline boundary succeeding the original start address. If the original start address is aligned on a cacheline boundary, then the multiple bus transaction requests comprise a high-performance bus transaction request with an optimized start address equal to the original start address and a low-performance bus transaction request with an optimized start address equal to a cacheline boundary succeeding a cacheline transferred in the high-performance bus transaction request. The optimized byte size for each of the multiple bus transaction requests is set equal to a remainder of a cacheline or a multiple of the cacheline size.

36 Claims, 18 Drawing Sheets

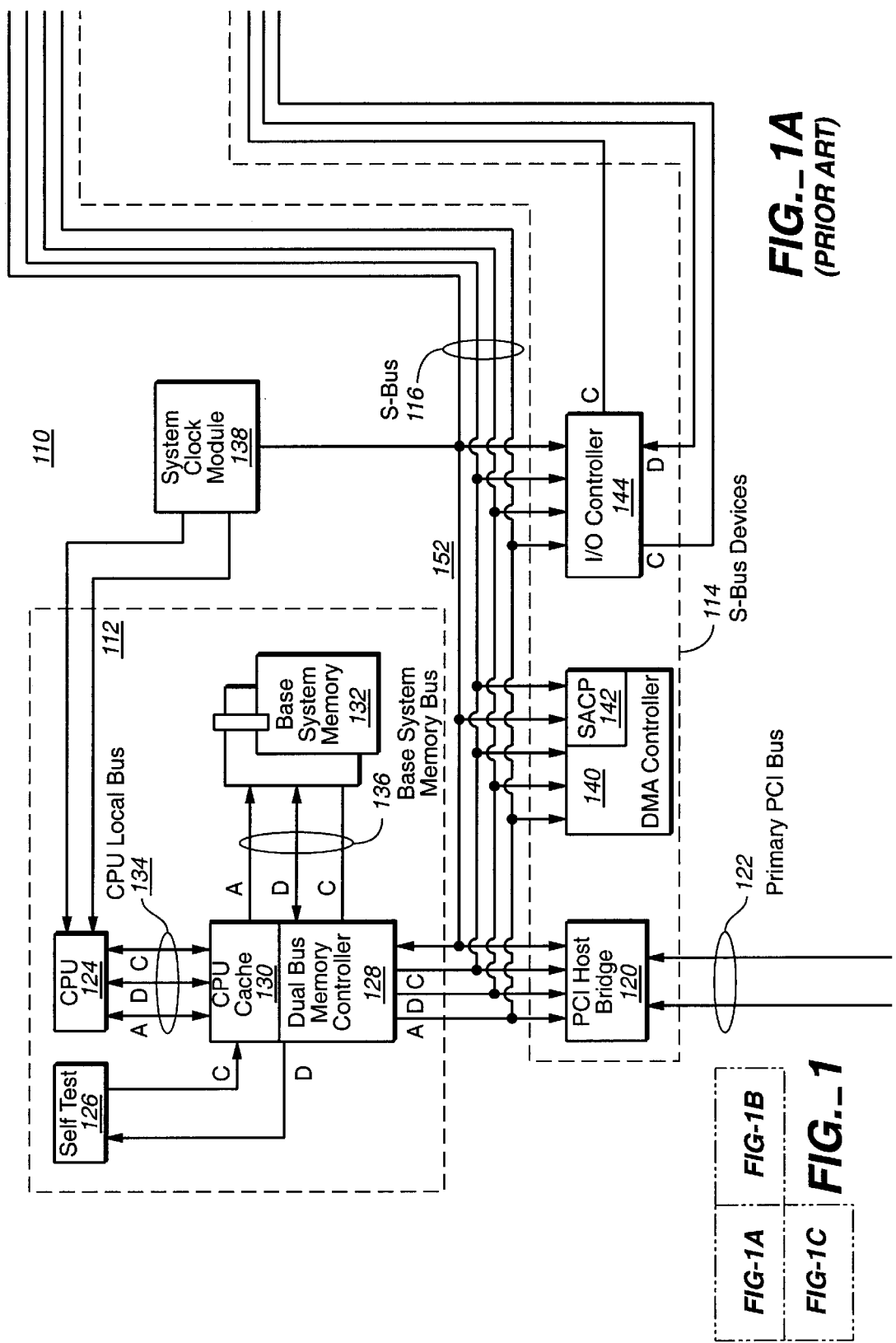
FIG._1A (PRIOR ART)

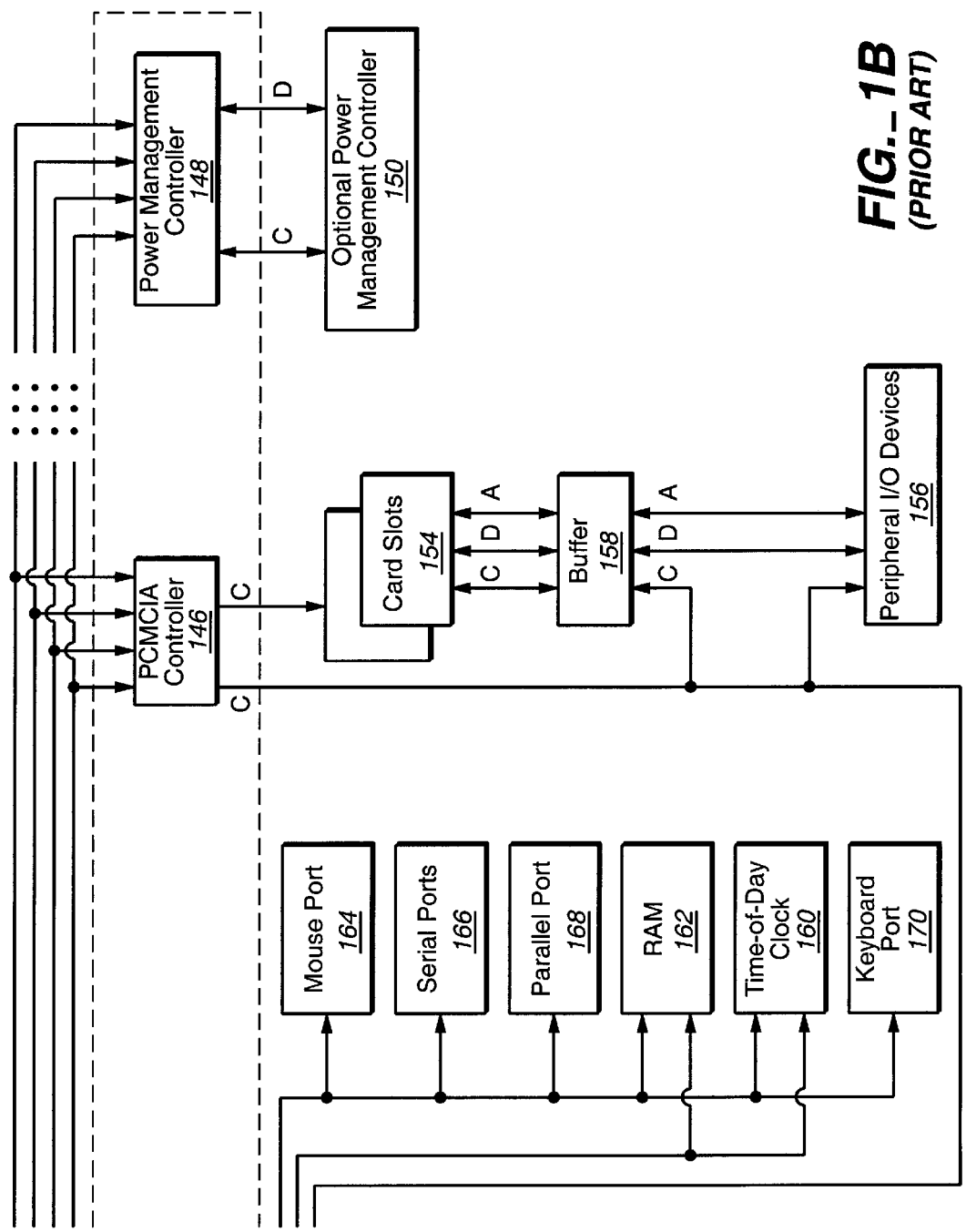
FIG._1B
(PRIOR ART)

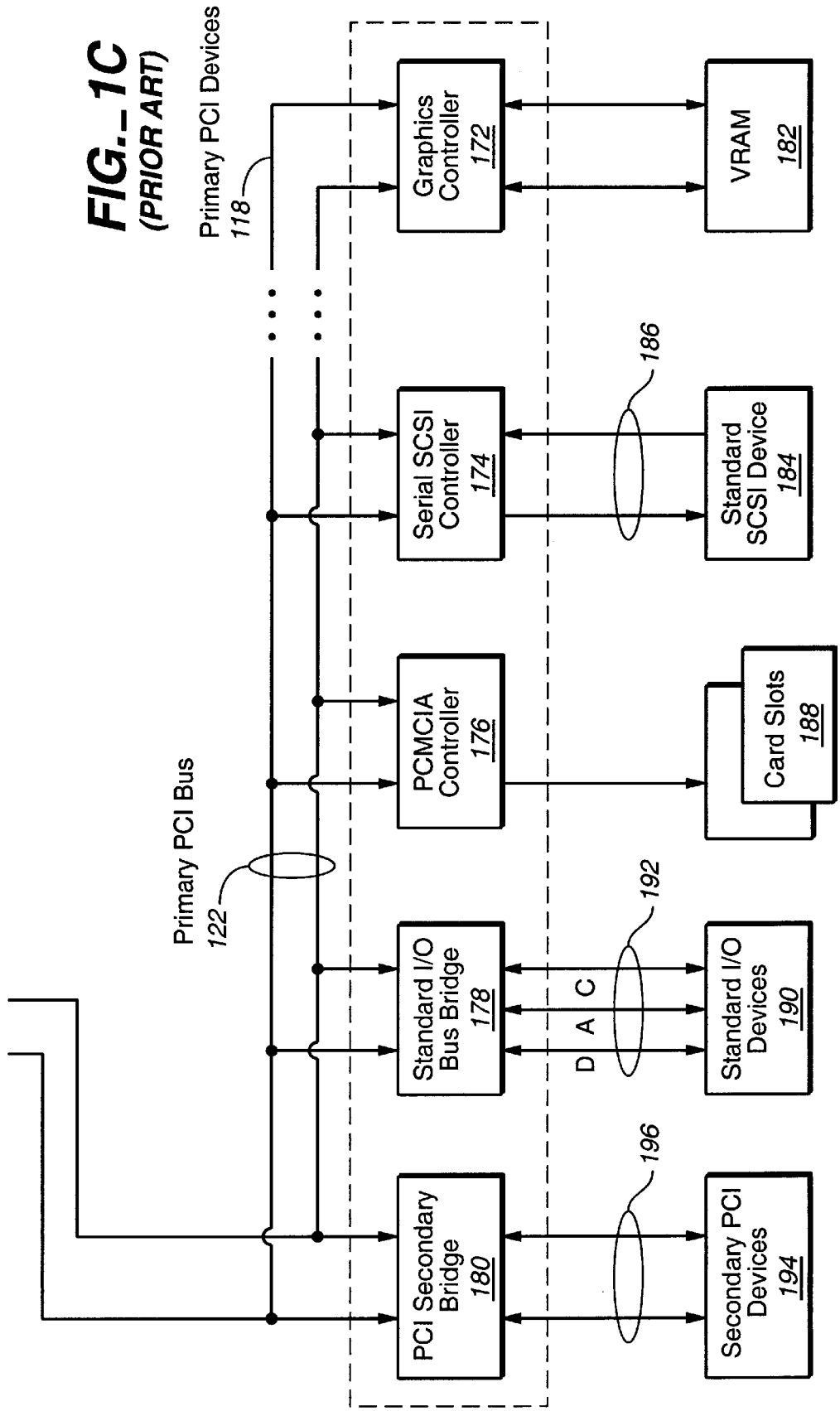
FIG._1C (PRIOR ART)

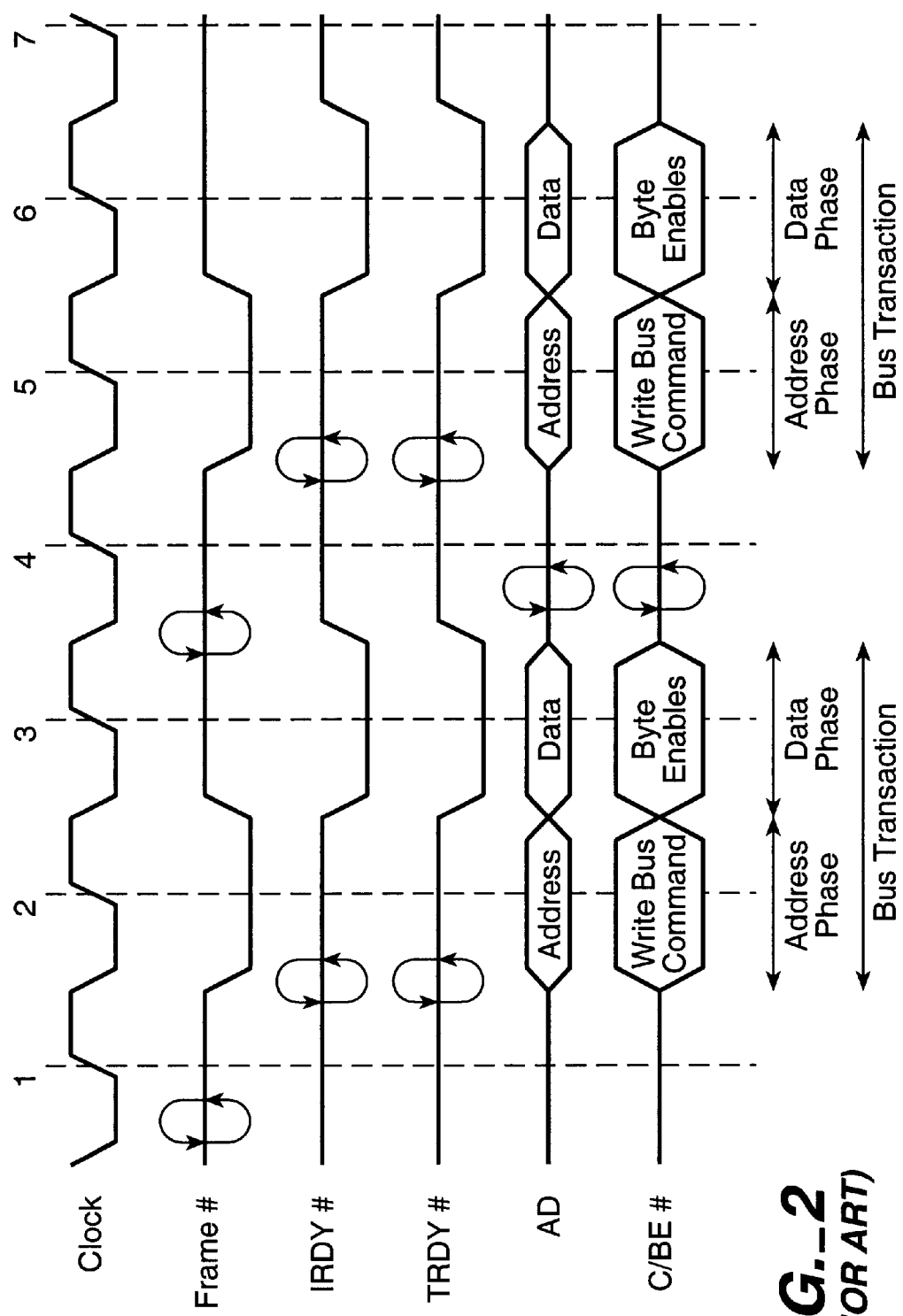
FIG._2 (PRIOR ART)

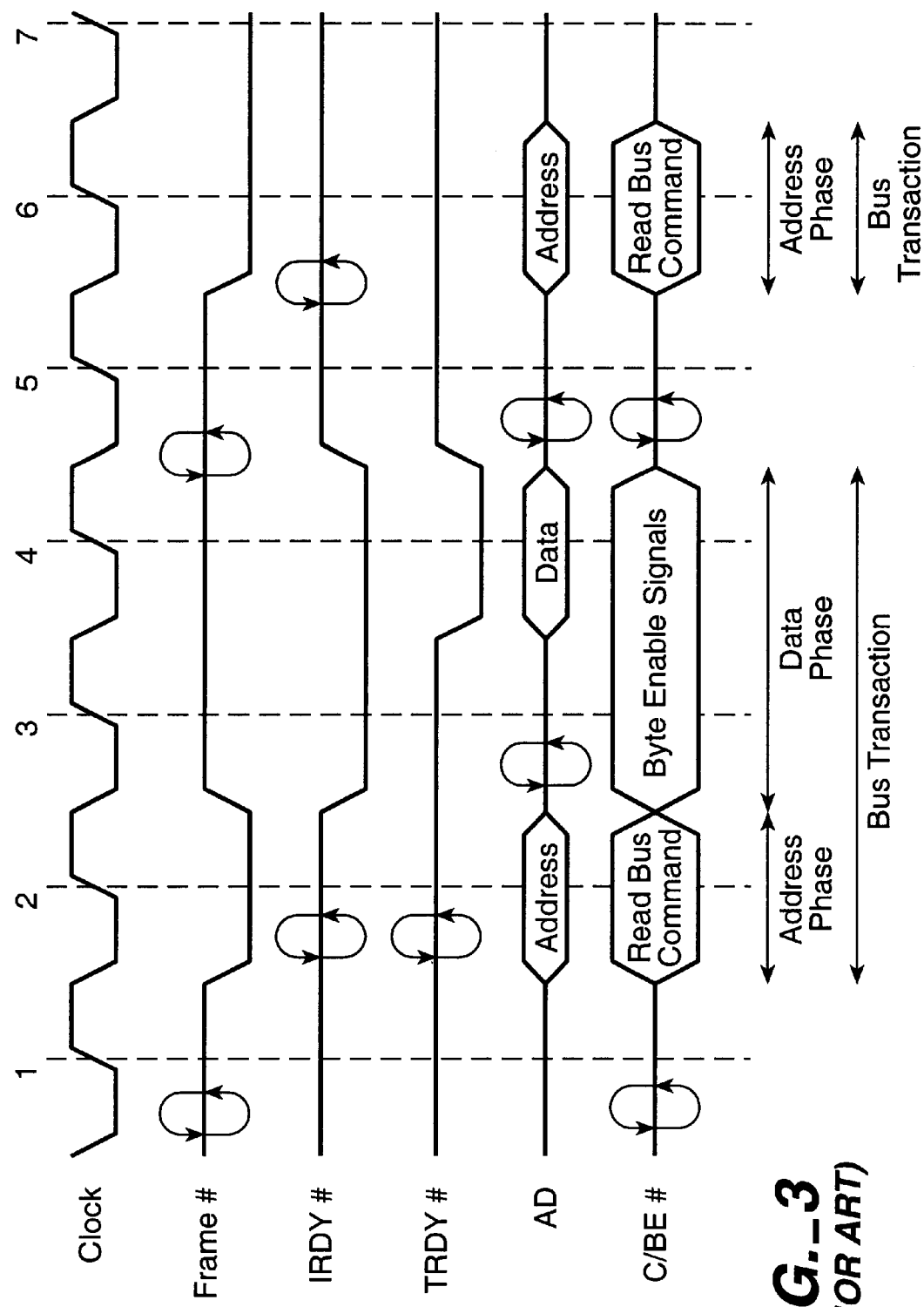
FIG._3 (PRIOR ART)

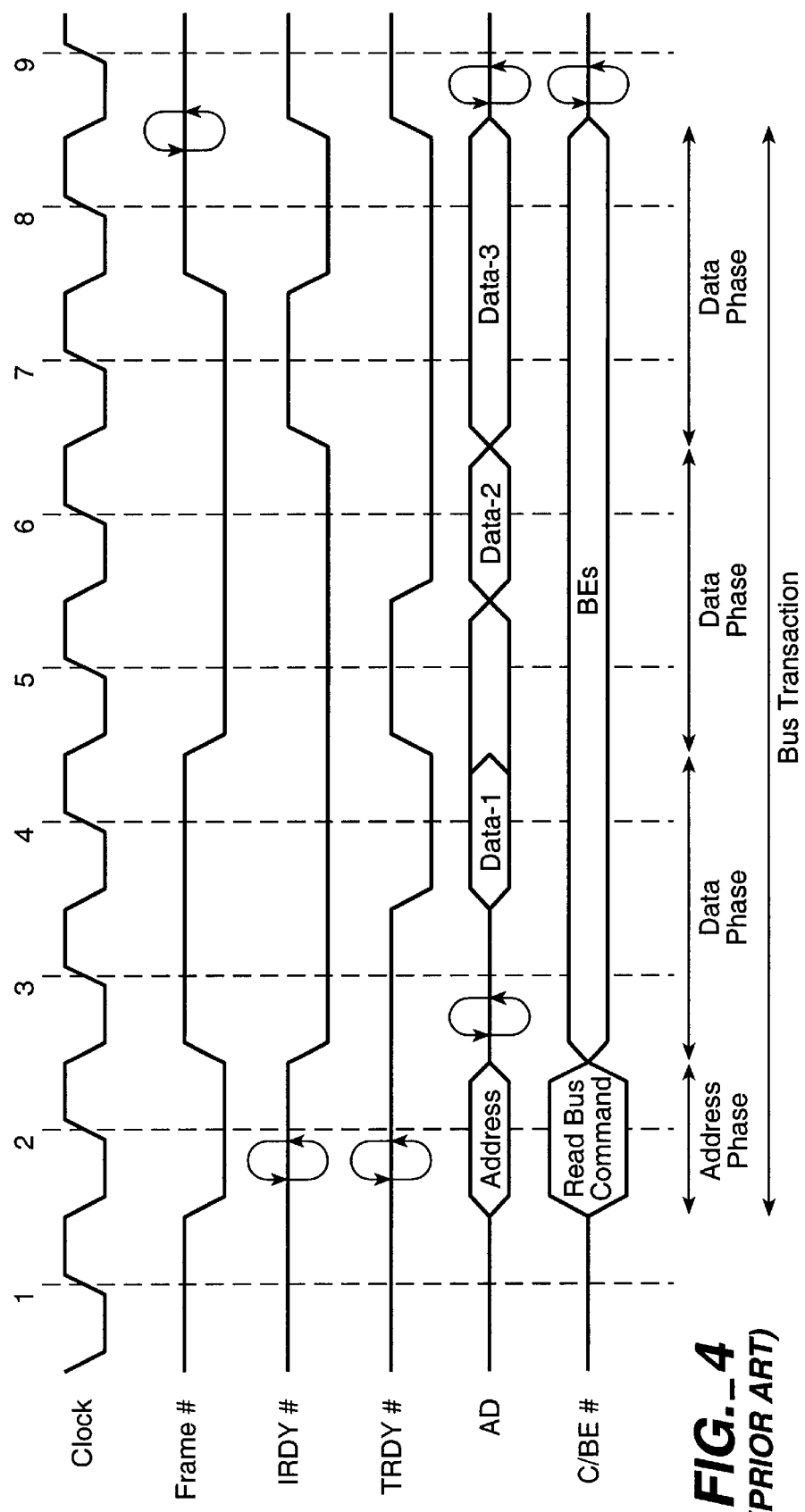
FIG._4
(PRIOR ART)

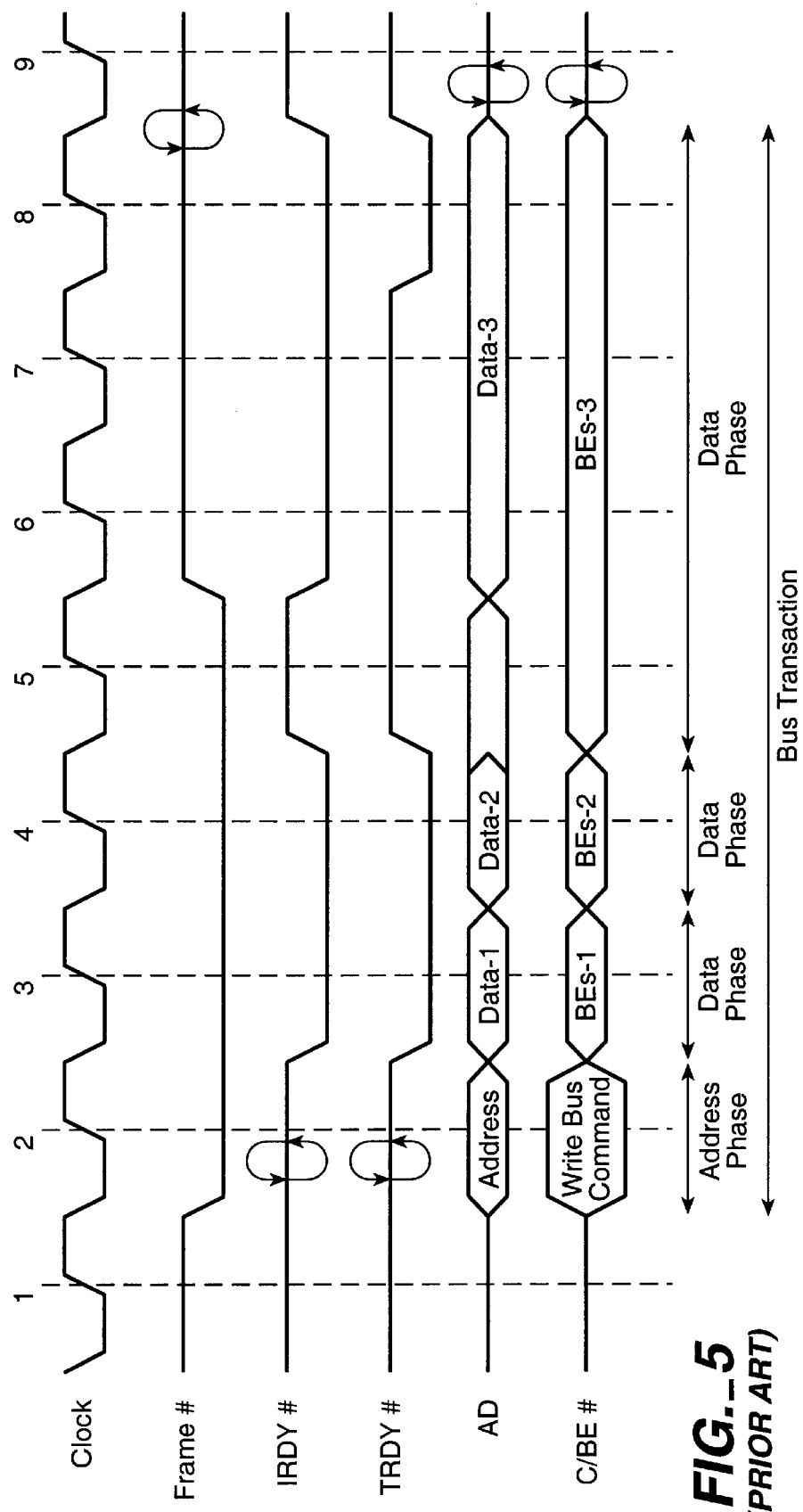
FIG._5 (PRIOR ART)

| C/BE[3::0] # | PCI Command Type |
|---|---|
| 0000 | Interrupt Acknowledge |
| 0001 | Special Cycle |
| 0010 | I/O Read |
| 0011 | I/O Write |
| 0100 | Reserved |
| 0101 | Reserved |
| 0110 | Memory Read |
| 0111 | Memory Write |
| 1001 | Reserved |
| 1010 | Reserved |
| 1011 | Configuration Read |
| 1100 | Configuration Write |
| 1101 | Memory Read Multiple |
| 1110 | Dual Address Cycle |
| 1111 | Memory Write and Invalidate |

| 31 | 16 | 15 | 0 | |
|---|---|---|---|---|
| Device ID | | Vendor ID | | 00h |
| Status | | Command | | 04h |
| Class Code | | | Revision ID | 08h |
| BIST | Header Type | Latency Timer | Cache Line Size | 0Ch |
| Base Address Registers | | | | 10h |
| | | | | 14h |
| | | | | 18h |
| | | | | 1CH |
| | | | | 20h |
| | | | | 24h |
| Cardbus CIS Pointer | | | | 28h |
| Subsystem ID | | Subsystem Vendor ID | | 2Ch |
| Expansion ROM Base Address | | | | 30h |
| Reserved | | | | 34h |
| Reserved | | | | 38h |
| Max_Lat | Min_Gnt | Interrupt Pin | Interrupt Line | 3Ch |

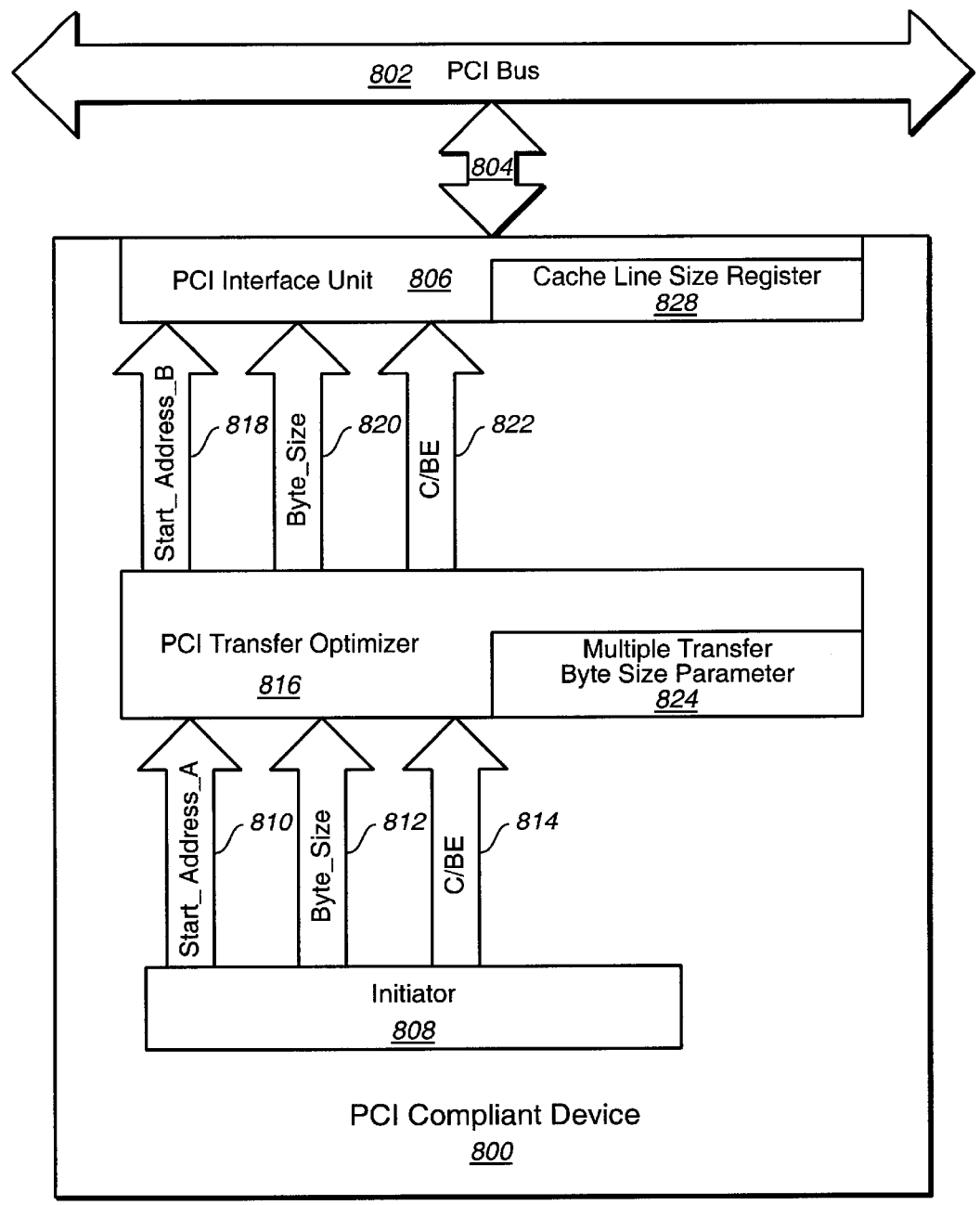
FIG._8 *(PRIOR ART)*

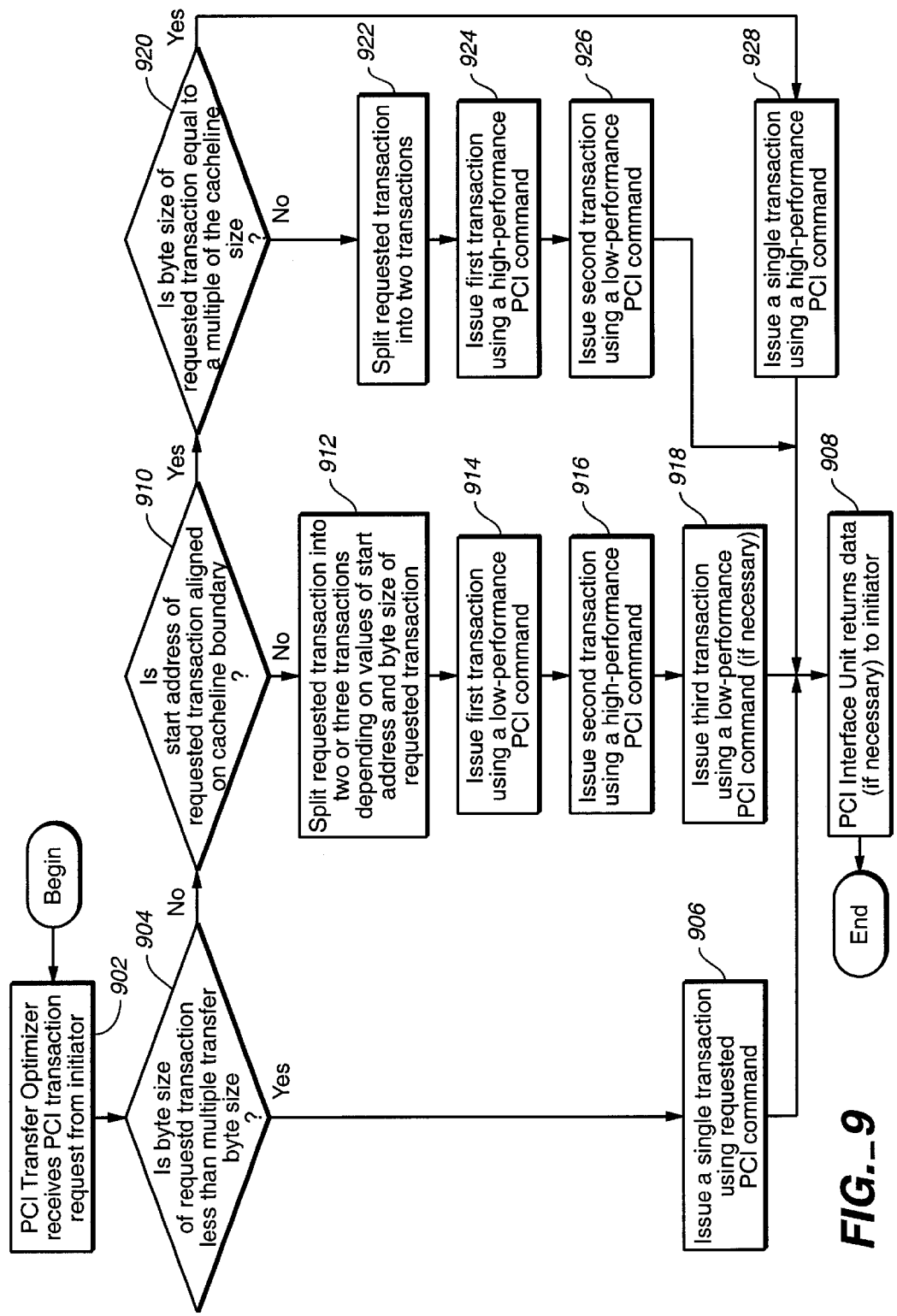
FIG._9

| | | | | | | |
|---|---|---|---|---|---|---|
| Cacheline 0 | 0 | 1 | 2 | ••• | (N-2) | (N-1) |
| Cacheline 1 | N | (N+1) | (N+2) | ••• | (2N-2) | (2N-1) |
| Cacheline 2 | 2N | (2N+1) | (2N+2) | ••• | (3N-2) | (3N-1) |
| Cacheline 3 | 3N | (3N+1) | (3N+2) | ••• | (4N-2) | (4N-1) |
| Cacheline 4 | 4N | (4N+1) | (4N+2) | ••• | (5N-2) | (5N-1) |
| Cacheline 5 | 5N | (5N+1) | (5N+2) | ••• | (6N-2) | (6N-1) |
| | | | | ⋮ | | |
| Cacheline (M-1) | N(M-1) | (N(M-1)+1) | (N(M-1)+2) | ••• | (N*M-2) | (N*M-1) |

Requested PCI Command: Memory Read
Start Address: (N+2)
Byte Size: (N+1)
PCI Transfer Optimizer Result: No Optimization

FIG._10A

| | | | | | | |
|---|---|---|---|---|---|---|
| Cacheline 0 | 0 | 1 | 2 | ••• | (N-2) | (N-1) |
| Cacheline 1 | N | (N+1) | (N+2) | ••• | (2N-2) | (2N-1) |
| Cacheline 2 | 2N | (2N+1) | (2N+2) | ••• | (3N-2) | (3N-1) |
| Cacheline 3 | 3N | (3N+1) | (3N+2) | ••• | (4N-2) | (4N-1) |
| Cacheline 4 | 4N | (4N+1) | (4N+2) | ••• | (5N-2) | (5N-1) |
| Cacheline 5 | 5N | (5N+1) | (5N+2) | ••• | (6N-2) | (6N-1) |
| | | | | ⋮ | | |
| Cacheline (M-1) | N(M-1) | (N(M-1)+1) | (N(M-1)+2) | ••• | (N*M-2) | (N*M-1) |

Requested PCI Command: Memory Read Line
Start Address: (3N)
Byte Size: (N+1)
PCI Transfer Optimizer Result: No Optimization

FIG._10B

| Cacheline 0 | 0 | 1 | 2 | ••• | (N-2) | (N-1) |
|---|---|---|---|---|---|---|
| Cacheline 1 | N | (N+1) | (N+2) | ••• | (2N-2) | (2N-1) |
| Cacheline 2 | 2N | (2N+1) | (2N+2) | ••• | (3N-2) | (3N-1) |
| Cacheline 3 | 3N | (3N+1) | (3N+2) | ••• | (4N-2) | (4N-1) |
| Cacheline 4 | 4N | (4N+1) | (4N+2) | ••• | (5N-2) | (5N-1) |
| Cacheline 5 | 5N | (5N+1) | (5N+2) | ••• | (6N-2) | (6N-1) |
|  |  |  | ⋮ |  |  |  |
| Cacheline (M-1) | N(M-1) | (N(M-1)+1) | (N(M-1)+2) | ••• | (N*M-2) | (N*M-1) |

Requested PCI Command: Memory Read
Start Address: (2)
Byte Size: (5N)
PCI Transfer Optimizer Result: Three PCI Transactions for Optimal Transfer

FIG._11A

| Cacheline 0 | 0 | 1 | 2 | ••• | (N-2) | (N-1) |
|---|---|---|---|---|---|---|
| Cacheline 1 | N | (N+1) | (N+2) | ••• | (2N-2) | (2N-1) |
| Cacheline 2 | 2N | (2N+1) | (2N+2) | ••• | (3N-2) | (3N-1) |
| Cacheline 3 | 3N | (3N+1) | (3N+2) | ••• | (4N-2) | (4N-1) |
| Cacheline 4 | 4N | (4N+1) | (4N+2) | ••• | (5N-2) | (5N-1) |
| Cacheline 5 | 5N | (5N+1) | (5N+2) | ••• | (6N-2) | (6N-1) |
|  |  |  | ⋮ |  |  |  |
| Cacheline (M-1) | N(M-1) | (N(M-1)+1) | (N(M-1)+2) | ••• | (N*M-2) | (N*M-1) |

First Optimized Transaction PCI Command: Memory Read
Start Address: (2)
Byte Size: (N-2)

FIG._11B

| Cacheline 0 | 0 | 1 | 2 | ••• | (N-2) | (N-1) |
|---|---|---|---|---|---|---|
| Cacheline 1 | N | (N+1) | (N+2) | ••• | (2N-2) | (2N-1) |
| Cacheline 2 | 2N | (2N+1) | (2N+2) | ••• | (3N-2) | (3N-1) |
| Cacheline 3 | 3N | (3N+1) | (3N+2) | ••• | (4N-2) | (4N-1) |
| Cacheline 4 | 4N | (4N+1) | (4N+2) | ••• | (5N-2) | (5N-1) |
| Cacheline 5 | 5N | (5N+1) | (5N+2) | ••• | (6N-2) | (6N-1) |
|  |  |  |  | ⋮ |  |  |
| Cacheline (M-1) | N(M-1) | (N(M-1)+1) | (N(M-1)+2) | ••• | (N*M-2) | (N*M-1) |

Second Optimized Transaction PCI Command: Memory Read Multiple
Start Address: (N)
Byte Size: (4N)

FIG._11C

| Cacheline 0 | 0 | 1 | 2 | ••• | (N-2) | (N-1) |
|---|---|---|---|---|---|---|
| Cacheline 1 | N | (N+1) | (N+2) | ••• | (2N-2) | (2N-1) |
| Cacheline 2 | 2N | (2N+1) | (2N+2) | ••• | (3N-2) | (3N-1) |
| Cacheline 3 | 3N | (3N+1) | (3N+2) | ••• | (4N-2) | (4N-1) |
| Cacheline 4 | 4N | (4N+1) | (4N+2) | ••• | (5N-2) | (5N-1) |
| Cacheline 5 | 5N | (5N+1) | (5N+2) | ••• | (6N-2) | (6N-1) |
|  |  |  |  | ⋮ |  |  |
| Cacheline (M-1) | N(M-1) | (N(M-1)+1) | (N(M-1)+2) | ••• | (N*M-2) | (N*M-1) |

Third Optimized Transaction PCI Command: Memory Read
Start Address: (5N)
Byte Size: (2)

FIG._11D

| Cacheline 0 | 0 | 1 | 2 | ••• | (N-2) | (N-1) |
|---|---|---|---|---|---|---|
| Cacheline 1 | N | (N+1) | (N+2) | ••• | (2N-2) | (2N-1) |
| Cacheline 2 | 2N | (2N+1) | (2N+2) | ••• | (3N-2) | (3N-1) |
| Cacheline 3 | 3N | (3N+1) | (3N+2) | ••• | (4N-2) | (4N-1) |
| Cacheline 4 | 4N | (4N+1) | (4N+2) | ••• | (5N-2) | (5N-1) |
| Cacheline 5 | 5N | (5N+1) | (5N+2) | ••• | (6N-2) | (6N-1) |
|  |  |  |  | ⋮ |  |  |
| Cacheline (M-1) | N(M-1) | (N(M-1)+1) | (N(M-1)+2) | ••• | (N*M-2) | (N*M-1) |

Requested PCI Command: Memory Read
Start Address: (2)
Byte Size: (5N-2)
PCI Transfer Optimizer Result: Two PCI Transactions for Optimal Transfer

FIG._12A

| Cacheline 0 | 0 | 1 | 2 | ••• | (N-2) | (N-1) |
|---|---|---|---|---|---|---|
| Cacheline 1 | N | (N+1) | (N+2) | ••• | (2N-2) | (2N-1) |
| Cacheline 2 | 2N | (2N+1) | (2N+2) | ••• | (3N-2) | (3N-1) |
| Cacheline 3 | 3N | (3N+1) | (3N+2) | ••• | (4N-2) | (4N-1) |
| Cacheline 4 | 4N | (4N+1) | (4N+2) | ••• | (5N-2) | (5N-1) |
| Cacheline 5 | 5N | (5N+1) | (5N+2) | ••• | (6N-2) | (6N-1) |
|  |  |  |  | ⋮ |  |  |
| Cacheline (M-1) | N(M-1) | (N(M-1)+1) | (N(M-1)+2) | ••• | (N*M-2) | (N*M-1) |

First Optimized Transaction PCI Command: Memory Read
Start Address: (2)
Byte Size: (N-2)

FIG._12B

| Cacheline 0 | 0 | 1 | 2 | ••• | (N-2) | (N-1) |
|---|---|---|---|---|---|---|
| Cacheline 1 | N | (N+1) | (N+2) | ••• | (2N-2) | (2N-1) |
| Cacheline 2 | 2N | (2N+1) | (2N+2) | ••• | (3N-2) | (3N-1) |
| Cacheline 3 | 3N | (3N+1) | (3N+2) | ••• | (4N-2) | (4N-1) |
| Cacheline 4 | 4N | (4N+1) | (4N+2) | ••• | (5N-2) | (5N-1) |
| Cacheline 5 | 5N | (5N+1) | (5N+2) | ••• | (6N-2) | (6N-1) |
|  |  |  |  | ⋮ |  |  |
| Cacheline (M-1) | N(M-1) | (N(M-1)+1) | (N(M-1)+2) | ••• | (N*M-2) | (N*M-1) |

Second Optimized Transaction PCI Command: Memory Read Multiple
Start Address: (N)
Byte Size: (4N)

FIG._12C

| Cacheline 0 | 0 | 1 | 2 | ••• | (N-2) | (N-1) |
|---|---|---|---|---|---|---|
| Cacheline 1 | N | (N+1) | (N+2) | ••• | (2N-2) | (2N-1) |
| Cacheline 2 | 2N | (2N+1) | (2N+2) | ••• | (3N-2) | (3N-1) |
| Cacheline 3 | 3N | (3N+1) | (3N+2) | ••• | (4N-2) | (4N-1) |
| Cacheline 4 | 4N | (4N+1) | (4N+2) | ••• | (5N-2) | (5N-1) |
| Cacheline 5 | 5N | (5N+1) | (5N+2) | ••• | (6N-2) | (6N-1) |
|  |  |  |  | ⋮ |  |  |
| Cacheline (M-1) | N(M-1) | (N(M-1)+1) | (N(M-1)+2) | ••• | (N*M-2) | (N*M-1) |

Requested PCI Command: Memory Read
Start Address: (N)
Byte Size: (4N+2)
PCI Transfer Optimizer Result: Two PCI Transactions for Optimal Transfer

FIG._13A

| Cacheline 0 | 0 | 1 | 2 | ••• | (N-2) | (N-1) |
|---|---|---|---|---|---|---|
| Cacheline 1 | N | (N+1) | (N+2) | ••• | (2N-2) | (2N-1) |
| Cacheline 2 | 2N | (2N+1) | (2N+2) | ••• | (3N-2) | (3N-1) |
| Cacheline 3 | 3N | (3N+1) | (3N+2) | ••• | (4N-2) | (4N-1) |
| Cacheline 4 | 4N | (4N+1) | (4N+2) | ••• | (5N-2) | (5N-1) |
| Cacheline 5 | 5N | (5N+1) | (5N+2) | ••• | (6N-2) | (6N-1) |
|  |  |  | ⋮ |  |  |  |
| Cacheline (M-1) | N(M-1) | (N(M-1)+1) | (N(M-1)+2) | ••• | (N*M-2) | (N*M-1) |

First Optimized Transaction PCI Command: Memory Read Multiple
Start Address: (N)
Byte Size: (4N)

FIG._13B

| Cacheline 0 | 0 | 1 | 2 | ••• | (N-2) | (N-1) |
|---|---|---|---|---|---|---|
| Cacheline 1 | N | (N+1) | (N+2) | ••• | (2N-2) | (2N-1) |
| Cacheline 2 | 2N | (2N+1) | (2N+2) | ••• | (3N-2) | (3N-1) |
| Cacheline 3 | 3N | (3N+1) | (3N+2) | ••• | (4N-2) | (4N-1) |
| Cacheline 4 | 4N | (4N+1) | (4N+2) | ••• | (5N-2) | (5N-1) |
| Cacheline 5 | 5N | (5N+1) | (5N+2) | ••• | (6N-2) | (6N-1) |
|  |  |  | ⋮ |  |  |  |
| Cacheline (M-1) | N(M-1) | (N(M-1)+1) | (N(M-1)+2) | ••• | (N*M-2) | (N*M-1) |

Second Optimized Transaction PCI Command: Memory Read
Start Address: (5N)
Byte Size: (2)

FIG._13C

| Cacheline 0 | 0 | 1 | 2 | • • • | (N-2) | (N-1) |
|---|---|---|---|---|---|---|
| Cacheline 1 | N | (N+1) | (N+2) | • • • | (2N-2) | (2N-1) |
| Cacheline 2 | 2N | (2N+1) | (2N+2) | • • • | (3N-2) | (3N-1) |
| Cacheline 3 | 3N | (3N+1) | (3N+2) | • • • | (4N-2) | (4N-1) |
| Cacheline 4 | 4N | (4N+1) | (4N+2) | • • • | (5N-2) | (5N-1) |
| Cacheline 5 | 5N | (5N+1) | (5N+2) | • • • | (6N-2) | (6N-1) |
|  |  |  |  | ⋮ |  |  |
| Cacheline (M-1) | N(M-1) | (N(M-1)+1) | (N(M-1)+2) | • • • | (N*M-2) | (N*M-1) |

Requested PCI Command: Memory Read
Start Address: (N)
Byte Size: (5N)
PCI Transfer Optimizer Result: Change PCI Command to Memory Read Multiple

FIG._14

METHOD AND SYSTEM FOR OPTIMIZING OF PERIPHERAL COMPONENT INTERCONNECT PCI BUS TRANSFERS

BACKGROUND OF THE INVENTION

1. Technical Field

The present invention relates generally to an improved data processing system and, in particular, to a method and system for optimizing the transfer of data on a bus in a data processing system.

2. Description of Related Art

In conventional personal computer (PC) architectures, the CPU, main memory, and other peripheral input/output (I/O) devices are commonly coupled by a bus network having a local bus and a system bus. The system bus connects to the local bus and is generally slower than the local bus. Examples of common system bus architectures are the industry standard architecture (ISA), extended industry standard architecture (EISA) and the MicroChannel bus. The dual bus network evolved in part because early PCs required high-speed data transfer only between the CPU and the main memory. Consequently, the CPU and the main memory are situated in the faster local bus, while the video subsystem as well as other peripheral I/O devices with varying clock speeds are usually connected to the slower system bus.

Two bus architectures are currently available that allow high-speed devices to couple to the local bus to provide high data transfer rates between devices on the bus. The Video Electronics Standards Association (VESA) established a standard local bus that allowed some components, such as graphics cards, to interface directly with the local bus. In the VESA bus, the bus clock speed is controlled by the CPU clock speed. The Peripheral Component Interconnect (PCI) bus offers another architecture in which a bus controller sits between the CPU local bus and a device such as a graphics card. According to the PCI specification, a master device coupled to the PCI bus requests a data transaction with a specific target device, also coupled to the PCI bus. Both the master and target devices conduct the data transaction according to the PCI specified protocols. The PCI bus is not tied to the speed of the CPU but the PCI specification limits the bus clock speed to 33-megahertz (MHz). In either the VESA bus or the PCI bus, data transfer occurs at most only once per clock cycle, thus the bus data transfer rate is limited to the bus clock speed, thereby limiting devices that are capable of and demand higher data transfer rates.

Computer systems demand increasingly higher data transfer rates. For example, graphics oriented operating systems such as Windows and OS/2 require large amounts of data to be transferred between the central processing unit (CPU) and the devices that drive display devices such as a monitor. Even though CPU clock speeds have increased, conventional data bus architectures have created a data bottleneck between the CPU and these data intensive peripheral devices.

For some time, all PC's employed the ISA expansion bus, which was an 8-MHz, 16-bit device (actually clocked at 8.33-MHz). Using two cycles of the bus clock to complete a transfer, the theoretical maximum transfer rate was 8.33 MBytes/sec. The EISA bus was then widely used as a next generation bus. It is a 32-bit bus clocked at 8-MHz that allows burst transfers at one per clock cycle, so the theoretical maximum was increased to 33-MBytes/sec. As performance requirements increased with faster processors and memory and increased video bandwidth needs, a high-performance bus standard was a necessity. Several standards were proposed, including a MicroChannel architecture, which was a 10-MHz, 32-bit bus, allowing 40-MByte/sec, as well as an enhanced MicroChannel using a 64-bit data width and 64-bit data streaming, theoretically permitting 80-to-160 MByte/sec transfer. The requirements imposed by use of video and graphics transfer on networks, however, necessitate even faster transfer rates. One approach was the VESA (Video Electronics Standards Association) bus, which was a 33-MHz, 32-bit local bus standard specifically for an Intel 486 processor, providing a theoretical maximum transfer rate of 132-MByte/sec for burst, or 66-MByte/sec for non-burst; the 486 had limited burst transfer capability. The VESA bus was a short-term solution as higherperformance processors, e.g., the Intel P5 and P6 or Pentium and Pentium Pro processors, became the standard.

The PCI bus was proposed by Intel as a longer-term solution to the expansion bus standard, particularly to address the burst transfer issue. The original PCI bus standard has been upgraded several times, with the current standard being Revision 2.1, available from a trade association group referred to as PCI Special Interest Group, P.O. Box 14070, Portland, Oreg. 97214. The PCI Specification, Rev. 2.1, is incorporated herein by reference. Construction of computer systems using the PCI bus, and the PCI bus itself, are described in many publications, including "PCI System Architecture," 3rd Ed., by Shanley et al, published by Addison-Wesley Pub. Co., also incorporated herein by reference. The PCI bus provides for 32-bit or 64-bit transfers at 33- or 66-MHz; it can be populated with adapters requiring fast access to each other and/or with system memory, and can be accessed by the host processor at speeds approaching that of the processor's native bus speed. A 64-bit, 66-MHz PCI bus has a theoretical maximum transfer rate of 528-MByte/sec. All read and write transfers over the bus can be burst transfers. The length of the burst can be negotiated between initiator and target devices and can be any length.

PCs have evolved to the point where high-speed data transfer is a critical factor in overall performance of the system. In particular, graphics intensive applications such as Computer Aided Design (CAD) require high-speed video devices that can drive high-resolution displays with more colors and three-dimensional capabilities. Video systems are being developed that require far more data transfer capability than current bus architectures and protocols can support.

Bus design and protocol is strictly regulated by industry standard specifications that dictate physical, mechanical, and electrical requirements for the bus. These specifications are necessary to ensure that devices from a wide variety of manufacturers can use the bus without negatively impacting other devices using the bus. One problem with industry standard specifications is that improvements to the bus architecture or protocol are difficult to implement. Hence, it is necessary that improvements are compatible with existing protocol and devices and comply with the industry standard specification.

Therefore, it would be advantageous to be able to implement a method for improving the speed of data transactions between a master device and a target device that is compatible with an existing bus architecture and protocol. It would be especially advantageous for the improvement to use existing, predefined bus commands in a manner that is transparent to the initiator and the target.

SUMMARY OF THE INVENTION

The present invention provides a method for optimizing bus transactions in a data processing system. A bus transaction optimizer receives an original bus transaction request which includes an original start address of a target memory for the original bus transaction, an original byte size for a number of bytes for the original bus transaction, and an original bus command for the original bus transaction. The bus transaction optimizer generates the optimal type and number of bus transaction requests required in order to complete the original bus transaction request in the shortest time frame possible irrespective of the value of the original start address or the original byte size.

The bus transaction optimizer deduces the type and number of bus transaction requests required to optimally complete the original bus transaction based upon the values of the original byte size and the original start address. The bus transaction optimizer may split the original transaction request into multiple bus transaction requests comprising both low and high performance transactions if it determines that by doing so the overall time required to complete the multiple bus transactions is less than the overall time required to complete the original transaction using a single low performance bus transaction. In cases in which the original bus transaction request is split up into multiple bus transaction requests, the bus transaction optimizer deduces the values for the start address, byte size, and bus command for each one of the bus transactions.

If the original byte size is less than a predetermined multiple transfer byte size date value, the bus transaction optimizer does not modify the original bus transaction request and allows it to complete in a single bus transaction based upon the original start address, the original byte size, and the original bus command. If the original byte size is greater than the multiple transfer byte size value, the bus transaction optimizer may generate multiple transfer requests (not exceeding three) depending upon the values of the original byte size and the original start address. The multiple transaction request will consist of one high performance requests and one or two low performance requests. If the original byte size is greater than the multiple transfer byte size value and is a multiple of the cacheline size for the system, and the original start address is aligned on a cacheline boundary, the bus transaction optimizer issues a single high-performance read or write command to complete the transaction.

If the original byte size is greater than the multiple transfer byte size value and the original start address is not aligned to a cacheline boundary and/or the original byte size is not a multiple of a cacheline size, the bus transaction optimizer will issue multiple transfer requests in order to complete the original bus transaction in the shortest time frame. The bus transaction optimizer deduces the start address, byte size and bus command for each of these multiple transfers. In these cases, the start address for the first transaction is always the original start address.

The byte size for the first transaction is equal to a multiple of cacheline bytes if the original start address is aligned to a cacheline boundary. If the original start address is not cacheline aligned, the byte size for the first transaction is equal to the number of addressable bytes in between the original start address and the next cacheline aligned address in the target memory. The bus command for the first transaction is a high-performance command if the original start address is aligned to a cacheline boundary and is a low-performance command if the original start address is not aligned to a cacheline boundary.

The start address for the second transaction is always cacheline boundary aligned and is equal to the cacheline boundary succeeding the original start address. If the start address of the first transaction was cacheline boundary aligned, the byte size for the second transaction is equal to the difference between the original byte size and the byte size of the first transaction. If the start address of the first transaction is not cacheline aligned, the byte size for the second transaction is equal to a multiple of cacheline bytes remaining to be transferred after the first transaction completed. The bus command for the second transfer is a high-performance command if the bus command for the first transfer was a low-performance command and is a low-performance command otherwise.

The third transfer is only required if the number of bytes transferred by the first two transactions is less than the original byte size. The start address for the third transaction will be aligned to the cacheline boundary succeeding the start address of the second transaction. The byte size for the third transaction will never be multiple of a cacheline size and is always equal to the difference between the original byte size and the number of bytes transferred by the first and second transactions. The bus command for the third transaction is always a low-performance transaction.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 1A–1C is a block diagram depicting a data processing system;

FIG. 2 is a prior art timing diagram depicting various PCI bus signals which occur over a PCI bus during two consecutive write cycles to a peripheral device attached to a PCI bus;

FIG. 3 is a prior art timing diagram depicting various PCI bus signals which occur over a PCI bus during two consecutive read cycles to a peripheral device attached to a PCI bus;

FIG. 4 is a prior art timing diagram depicting various PCI signals, which occur over a PCI bus during a multiple data phase read transaction;

FIG. 5 is a prior art timing diagram depicting various PCI signals, which occur over a PCI bus during a multiple data phase write transaction;

FIG. 6 is a prior art table listing the types and encoding of PCI bus commands;

FIG. 7 is a prior art memory map diagram showing the memory locations for specifying functional parameters within a PCI compliant device;

FIG. 8 is a block diagram depicting a PCI compliant device in which the PCI transfer optimizer of the present invention may be employed;

FIG. 9 is a flowchart depicting the process of analyzing a PCI transaction request for optimization using high-performance PCI commands according to the present invention; and FIGS. 10A–14 are block diagrams depicting memory maps showing locations of requested data within the memory of targets of requested PCI commands.

DETAILED DESCRIPTION OF THE PREFERRED EMBODIMENT

With reference now to FIGS. 1A–1C, a block diagram depicts a data processing system. Multi-bus information handling system 110 is shown generally comprising: (i) a processor, cache and memory complex 112 connected to system bus devices 114 via system bus (S-bus) 116 and (ii) primary PCI devices 118 attached to one of the system bus devices, primary PCI host bridge 120, via primary PCI bus 122. More detailed descriptions of the processor, cache and memory complex 112, system bus devices 114, primary PCI devices 118, and the other elements shown in FIGS. 1A–1C will be provided hereinafter.

The processor, cache, and memory complex 112 comprises central processing unit (CPU) 124, self-test circuit 126, dual bus memory controller 128, CPU cache 130, and base system memory 132. CPU 124 may be a 32-bit microprocessor available from Intel, Inc., although it is contemplated that system 110 may be implemented using other types of CPUs. Self-test circuit 126 provides a built-in-self-test (BIST) feature for CPU 124 upon power-up. The self-test circuit also controls any self-test features, which may be incorporated within each of system bus devices 114.

CPU 124 is connected to self-test circuit 126 and dual bus memory controller 128 by CPU local bus 134. Dual bus memory controller 128 is connected to base system memory 132 by means of base system memory bus 136. Dual bus memory controller 128 controls read and write operations to base system memory 132 over base system memory bus 136, which operations are initiated by either CPU 124 over CPU local bus 134, or by system bus device 114 over S-bus 116. Because the memory controller has the capability to manage operations on two buses, operations over base system memory bus 136 and CPU local bus 134 may be managed simultaneously. S-bus 116, base system memory bus 136, and CPU local bus 134 are 32-bit buses, each of which comprises data, address, and control information paths ("D", "A", and "C" in FIGS. 1A–1C) as is typical of such buses.

Base system memory 132 provides system-wide storage capability and may comprise either non-interleaved or interleaved memory cards. CPU cache 130 permits short-term storage of information contained within either base system memory 132 or expansion memory located elsewhere within system 110. Such expansion memory could, for example, be located on the peripherally attached I/O devices within the system. CPU cache 130 incorporates random access memory, which is, used to temporarily store address locations of base system memory 132, which are frequently accessed by CPU 124. CPU 124 accesses information stored in CPU cache 130 directly, whereas access to information stored in base system memory 132 must be handled by dual bus memory controller 128.

All access to base system memory 132 is controlled by dual bus memory controller 128 via base system memory bus 136. The memory controller initiates system memory cycles to base system memory 132. During these cycles, either CPU 124 or one of system bus devices 114 has access to base system memory 132 via dual bus memory controller 128. During a memory cycle directed to it, dual bus memory controller 128 responds to the memory cycle. However, if the memory cycle is not directed to dual bus memory controller 128, the information passes onto S-bus 116. If dual bus memory controller 128 determines that the operation it is managing is an I/O cycle, the memory controller propagates the information onto S-bus 116 for access thereto by a system bus device. If the I/O cycle is destined for a system bus device, the appropriate system bus device responds with a decode command to the memory controller. If the I/O operation is destined for primary PCI device 118, PCI host bridge 120 responds with a decode command to the memory controller and passes the I/O cycle to the appropriate primary PCI device.

System clock module 138 provides a single clock signal for system bus devices 114, and a pair of clock signals for CPU 124. The clock signal provided to the system bus may operate at 33-MHz. The two signals provided to CPU 124 operate at 33-MHz and 66-MHz, respectively. CPU 124 requires two clock signals because it operates internally at 66-MHz, but communicates over CPU local bus 134 at 33-MHz.

Communications between the processor, cache and memory complex 112 and the system bus devices are managed by dual bus memory controller 128 over 32-bit S-bus 116. Also attached to the system bus, as shown in FIGS. 1A–1C, are direct memory access (DMA) controller 140, system arbitration control point (SACP) 142, input/output (I/O) controller 144, PCMCIA controller 146, and power management controller 148. Optional power management controller 150 may be attached to power management controller 148 in case more sophisticated power management control is desired. Buffer 152 is provided on S-bus 116 intermediate DMA controller 140 and I/O controller 144. As shown in FIGS. 1A–C, however, it is contemplated that other system bus devices 114, beyond those shown, may be attached to S-bus 116.

PCMCIA controller 146 is attached directly to PCMCIA card slots 154. Peripheral I/O devices 156 may be connected to PCMCIA card slots 154 by means of buffers 158. Peripheral I/O devices 156 are controlled by I/O controller 144. Attached to the I/O controller are time-of-day clock 160 and RAM module 162. I/O controller 144 supports a variety of ports, including mouse port 164, serial ports 166, parallel port 168, and keyboard port 170.

In addition to supporting system bus devices 114 on S-bus 116, system 110 also supports a second high speed, high bandwidth bus, which is shown as primary PCI bus 122. Primary PCI bus 122 is capable of performing significant data transfer in a relatively short period of time (up to 120 megabytes of data per second). The PCI bus achieves this high level of performance, in part, because it may be directly linked to other high speed buses, such as system buses to which a CPU may be connected, and thus may provide for rapid transfer of data between devices attached to the PCI bus and devices attached to the system bus. In fact, the operation of several high integration devices, such as certain graphics package controllers, require a direct link to a system bus through a high-performance bus such as the PCI bus. In addition, the PCI bus architecture does not require any "glue logic" to operate peripheral devices connected to it. Glue logic for other buses typically consists of miscellaneous hardware components such as a decoders, buffers or latches that are installed intermediate the peripheral devices and the bus.

The primary PCI bus operates on a synchronous clock signal of 33-MHz, and the strings of data transmitted over the PCI bus are 32-bits long. A 32-bit data string on the PCI bus is called a double word (DWORD), which is divided into 4 bytes each comprised of 8 bits of data. The address and data information carried by the PCI bus are multiplexed onto one signal. Multiplexing eliminates the need for separate address and data lines, which in turn, reduces the amount of signals required in a PCI bus environment as opposed to other bus architectures. The number of signals required in PCI bus architecture is between 45–47 while non-multiplexed buses typically require twice this number. Accordingly, because the number of signals are reduced, the number of connection pins required to support a device linked to the PCI bus is also reduced by a corresponding number. PCI architecture is thus particularly adapted for highly integrated desktop computer systems.

Primary PCI devices 118 in system 110 communicate with each other over primary PCI bus 122. Primary PCI devices 118 communicate with the CPU, cache and memory complex 112 and with other system bus devices 114 residing on S-bus 116 by means of PCI host bridge 120, which is itself a system bus device residing on the system bus. PCI host bridge 120, then, serves as an interface between S-bus 116 and primary PCI bus 122 and provides an effective means of communication between these two buses, and any peripheral devices which may be attached to these buses.

PCI host bridge 120 is a low latency interconnect mechanism through which CPU 124 or other system bus device 116 may directly access primary PCI devices 118 or devices attached thereto. Bridge 120 also provides a high-performance path, which allows the primary PCI devices, or devices attached thereto, quick and direct access to base system memory 132. In addition, PCI host bridge 120 provides all of the hardware required to provide an interface between S-bus 116 and primary PCI bus 122 so that data may be transferred between these buses.

An alternate configuration of information handling system 110 eliminates S-bus 116 so that PCI host bridge 120 connects primary PCI bus 122 directly to CPU local bus 134. In this configuration any of S-bus devices 114 could be connected to CPU local bus 134.

Primary PCI bus 122 is capable of supporting a variety of devices which are PCI compatible. As shown in FIGS. 1A–1C, these devices may include graphics controller 172, serial SCSI (Small Computer Systems Interface) controller 174, PCMCIA controller 176, standard I/O bus (e.g., ISA or MicroChannel) bridge 178 (also referred to herein as an expansion bridge), and PCI secondary bridge 180.

Graphics controller 172 is typically provided with memory capability in the form of VRAM 182, which enables the graphics controller to buffer video frames therein and may control any known graphics package which may be supported by PCI bus architecture. Serial SCSI controller 174 serves as an interface between Standard SCSI device 184 attached to SCSI bus 186 and primary PCI bus 122 and may control any SCSI device which may be supported by PCI bus architecture. PCMCIA controller 176 is attached to and controls card slots 188.

Standard bus bridge 178 serves as an interface between I/O devices 190 attached to standard (e.g., MicroChannel or ISA) bus 192 and primary PCI bus 122. Secondary PCI devices 194 are connected to PCI secondary bridge 180 via secondary PCI bus 196. Any number of unidentified secondary PCI devices 194 may then be connected to secondary PCI bus 196. PCI secondary bridge 180 serves as an interface between secondary PCI devices 194 attached to secondary PCI bus 196 and primary PCI bus 122.

Any number of peripheral devices that are compatible with the PCI bus architecture may be arranged on primary PCI bus 122 with no other PCI buses present in all of computer system 110. Alternatively, any number of PCI peripheral devices could be attached to primary PCI bus 122 with any number of secondary PCI buses, in addition to PCI bus 196, attached through the same number of separate, respective PCI secondary bridges 180 to primary PCI bus 122. Each secondary PCI bus could also have any number of additional PCI buses attached through PCI bridges to it and these "tertiary" PCI buses could have further PCI buses attached to them in various combinations. Similarly each PCI bus could have any number of PCI devices attached to it. Each connection between two PCI buses must be through a PCI bridge identical to bridge 180.

Furthermore, it is possible that a plurality of bridges identical to PCI host bridge 120 could be driven by S-bus 116. Each of these host bridges could then have any number of PCI buses, bridges and devices connected to them in any arrangement that the designer of system 110 wishes. Thus, the portion of system 110 that is comprised of PCI bus architecture may be comprised of multiple buses and PCI peripheral devices arranged in various peer and hierarchical combinations (referred to hereinafter generally as a PCI network).

The depicted examples in FIGS. 1A–1C are not meant to imply architectural limitations with respect to the present invention.

FIGS. 2–5 are examples of timing diagrams according to the PCI standard specification. These figures show the manner in which the PCI bus signals provide a mechanism for various bus transactions to transfer data between system components.

With reference now to FIG. 2, a prior art timing diagram depicts various PCI bus signals which occur over a PCI bus during two consecutive write cycles to a peripheral device attached to a PCI bus. This peripheral device could be graphics controller 172, standard bus bridge 178, or any other peripheral device that can be driven from a PCI bus. Similarly, the write cycles shown in FIG. 2 are typical PCI bus write cycles and are not unique to primary PCI bus 122. They could be write cycles on secondary PCI bus 196 or any other PCI bus in the PCI network.

The clock signal (CLOCK) provides the timing for all communications on the PCI network. CLOCK is an input to every PCI device and all PCI bridges. CLOCK is synchronous, meaning that all communication signals in PCI architecture have a duration of at least one clock and any commands or data transfers are executed over the period of at least one clock. The signals in FIG. 2 are separated into individual "clocks" or "phases" by the vertical dashed lines. Each dashed line represents the beginning of one clock duration and the end of the immediately preceding clock duration. The signals on each line are sampled or have their effective meaning on the rising edge of the clock signals.

The frame signal (FRAME#) is used by any PCI bridge or peripheral device connected to the PCI bus to indicate that it is initiating a communication cycle, or an access, to another PCI bridge or peripheral device connected to the bus. The peripheral device or PCI bridge initiating an access is called a master or an initiator. The device or component to which the access is directed is called a slave or target. FRAME# is a negative active signal. Thus, when a master drives the FRAME# low as shown in clock number 2, a master is indicating to a slave that it is initiating an access.

The initiator ready signal (IRDY#) is also negative active and indicates when the master is ready for a data transfer to begin. Thus, the master drives IRDY# low when it is ready to accept data during a read cycle or transfer data to the slave during a write cycle.

The target ready signal (TRDY#) is activated low and indicates when a slave is ready for a data transfer to begin. Thus, the slave drives TRDY# low when it is ready to accept data from the master during a write cycle or to transfer data to the master during a read cycle.

The address/data signals (AD) carry both the address of a register to which a data transfer is targeted and the data that is to be transferred multiplexed on the same PCI pins. A bus transaction consists of an address phase followed by one or more data phases. PCI supports both read and write bursts.

The address information is driven on AD by the master during an address phase when it asserts FRAME#. During the address phase, the AD lines contain a physical address. For I/O, this is a byte address; for configuration and memory, it is a DWORD address. Write data is stable and valid when IRDY# is asserted, and read data is stable and valid when TRDY# is asserted. Data is transferred during those clocks where both IRDY# and TRDY# are asserted.

Depending upon whether the access is a write cycle or a read cycle, during a data phase, the master or slave, respectively, will provide the data that is then driven on AD after the address phase. The address phase has the duration of one clock, and the data phase is at least one clock but can be more than one clock if the data transfer is delayed by the assertion of IRDY# by the PCI master or TRDY# by the slave.

The command/byte enable signals (C/BE#) provide PCI bus commands and byte enable signals multiplexed on the same PCI pins. A bus command is asserted by the master when it asserts FRAME# during the address phase on AD. The bus command can either be a read or a write command depending upon which type of access the master is initiating.

The byte enable signals are present on C/BE# during the data phase on AD. The byte enables are valid for the entire data phase and determine which byte lanes carry meaningful data. The byte enable signals consist of four bits. When all of these four bits are activated low, they indicate that all four bytes or all 32-bits of data being transferred on AD are enabled. Enabled data is normal, intelligible data. When one of the four bits is a high, then one of the four bytes of data being transferred on the PCI bus is not enabled, meaning that particular byte of data is unintelligible and should be ignored by the devices or components receiving or transmitting the data string.

A 32-bit PCI data/address bus can access addresses from 00000000 to FFFFFFFF, expressed in hexadecimal. Ordinarily, peripheral devices are mapped into a relatively small portion of memory at the high end of this range. During memory data transactions in the PCI bus, the two least significant address bits are not used as an address since the byte enables provide the equivalent information to the two least significant address bits. Standard PCI uses the extra two bits to indicate transfer burst ordering to indicate a double-speed transfer. Thus, each address uses only the thirty most significant bits and cannot provide byte level resolution. Each address therefore is associated with four bytes of memory. These four bytes do not have to be consecutive (not all 4 bytes need be enabled), but for purposes of discussion, it will be assumed that they are consecutive.

These four bytes form a "word" for data transaction purposes and will be transferred together during a single data phase. To provide byte-level resolution, the byte enable control signals on the C/BE bus are used to indicate which of the four bytes in a transferred word are valid. For example, to access the address FFFFFFFF, an address of FFFFFFFC is generated, which is the highest address possible without the two least significant bits available. This address corresponds to a word consisting of the data bytes at addresses FFFFFFFC, FFFFFFFD, FFFFFFFE, and FFFFFFFF. The byte enable signals are used to indicate that only the fourth byte is valid data.

The function of the various PCI bus signals during the simple write operation as shown in FIG. 2 is as follows. During the second clock, a master drives FRAME# low, which means the master is initiating an access to a slave. IRDY# and TRDY# are in a turnaround cycle during the second clock. At this time, the master provides the address of the register in the slave to which the access is targeted on the AD lines. Simultaneously, a write command is generated by the master on the C/BE# lines.

Moving on to the third clock, FRAME# is deasserted, which means the access is ready to be completed. The master now has gained control of the IRDY# line and drives it low, indicating the master is ready to transfer data to the slave. The slave has also gained control of the TRDY# line and activates it low, indicating that it has decoded the address information as an address of a register within itself and is ready to accept data in that register. Thus, on the third clock, data is transferred on the AD lines from the master into the slave in its decoded register.

When the data is transferred, the C/BE# line asserts its byte enable signals indicating whether the data is enabled. If one or more of the four bits are high, then the corresponding byte of data on the AD lines is not enabled.

During the fifth clock the timing diagram repeats itself since another write cycle has been initiated. This second write cycle could be initiated by the same master or a different one. Similarly, the target of the write cycle could be the same slave or an entirely different one.

To eliminate any risk of contention between various devices connected to the PCI bus, each line goes through a turnaround cycle before the second write cycle is initiated.

With reference now to FIG. 3, a prior art timing diagram depicts various PCI bus signals which occur over a PCI bus during two consecutive read cycles to a peripheral device attached to a PCI bus. During clock number 2, the master asserts FRAMES# low. FRAME# remains low for only one clock signal, clock number 2, since this is a single data phase transfer. Address information is also supplied on AD by the master and a read command is given on the C/BE# lines during clock number 2.

In the third clock sequence, the AD lines must go into a turnaround cycle because the slave has to take control of the AD lines during the fourth clock signal to provide the data that the master has requested to read. This turnaround cycle is necessary to eliminate contention between the master and slave on the AD lines. The master asserts IRDY# low during clock number 3 signaling it is prepared to read the requested data. During the third clock signal, the master also asserts the byte enable signals on the C/BE# lines.

During the fourth clock signal, the slave provides the data on the AD lines and asserts TRDY#. The byte enables are still asserted on the C/BE# lines. Since the IRDY# signal is low in the fourth clock, the data to be read is transferred from the slave to the master.

When a master connected to a PCI bus needs to transfer data to a component or device connected to a system or CPU local bus, a two-step procedure must be used. (System buses, for example S-bus 116, and CPU local buses both conform to Intel X86-type bus architecture, and thus it will be hereinafter referred to as CPU local bus architecture.) During the first step, the host bridge that connects the PCI bus to the CPU local bus is a slave for a data transfer on the PCI bus. For the second step, the host bridge becomes a master for a read or write cycle, whatever the case may be, on the CPU local bus and the device or component to which the data transfer is targeted is a slave for this particular data transaction.

For instance, if graphics controller 172 targets a write cycle for DMA controller 140, PCI host bridge 120 becomes a slave for a write cycle on primary PCI bus 122. The data to be written during the write cycle is then transferred to PCI host bridge 120. PCI host bridge 120 then becomes the master for a write cycle on S-bus 116 with DMA controller 140 as the slave or target of the write cycle. The data is then again transferred from PCI host bridge 120 to DMA controller 140 during the write cycle on S-bus 116. Read cycles operate in a similar two-step procedure wherein host bus 120 is a slave on Primary PCI bus 122 and then becomes the master to complete the data transfer on S-bus 116.

Furthermore, if a master on S-bus 116 initiates a data transfer to a device on Primary PCI bus 122, it must first use PCI host bridge 120 as a slave. PCI host bridge 120 then becomes the master for the data transfer on Primary PCI bus 122.

Data transfers between devices connected to PCI buses below PCI secondary bridge 180 in the PCI network and components connected to CPU local bus 134 or S-bus 116 must complete the data transfers up through the PCI network by performing consecutive data transfers to and from the PCI bridges connecting the network together. Once PCI secondary bridge 180 has the data to be transferred, if the particular transfer is a write cycle, then the two-step procedure set forth above is used to complete the data transfer with PCI secondary bridge 180 used as a master on Primary PCI bus 122 and PCI host bridge 120 being a slave on Primary PCI bus 122 and a master on S-bus 116.

Data transfers between S-bus 116 and Primary PCI bus 122 must be completed in two-steps because they have different bus architectures. In the CPU local bus architecture, data and address information are not multiplexed as in the PCI bus architecture; they are transmitted on separate lines. The strings of data and address information on these lines are 32-bits (4 bytes) in length.

The CPU local bus architecture does have a byte enable line, which performs the identical function of the byte enable signals in PCI bus architecture. Thus, the byte enable signals in the CPU local bus architecture are four bits in length and indicate whether a particular byte of the data on the data line is enabled or not enabled (disabled).

CPU local bus 134 and S-bus 116 use the CLOCK signal from Primary PCI bus 122 as a timing signal. Each duration of the clock signal on the CPU local bus 134 and S-bus 116 is called a bus cycle.

Unlike PCI bus architecture, the data and address information of CPU local bus 134 are transmitted on separate lines. Thus, once the slave, to which a data transfer is targeted, responds to the address transmitted on the address line, the data transfer can be completed in one bus cycle on the CPU local bus. During a burst transfer of several 32-bit strings of data to consecutive addresses, once the slave responds for the first transfer, each of the subsequent data transfers can be completed in a single bus cycle. During a data transfer, the byte enable line generates the byte enable signals on the CPU local bus.

Referring to FIG. 2, if the write cycle illustrated in clock Nos. 2 through 4 is ultimately targeted for a component connected to S-bus 116, PCI host bridge 120 is the slave to which the PCI write cycle is directed. Accordingly, PCI host bridge 120 receives the data transmitted in the third clock in one of its internal registers by responding to the address transmitted in the second clock.

Then, once it gains control of S-bus 116, PCI host bridge 120, acting as a master, generates a write cycle on S-bus 116. During the first bus cycle, PCI host bridge 120 transfers the same address information, and byte enable signals it received during the PCI write cycle onto their respective lines on S-bus 116. The appropriate slave responds to the address information and the data is transferred during the next bus cycle after the response.

With reference now to FIG. 4, a prior art timing diagram depicts various PCI signals which occur over a PCI bus during a multiple data phase read transaction. FIG. 4 illustrates a multiple data phase transaction as opposed to the single data phase read transaction of FIG. 3. The transaction starts with an address phase, which occurs when FRAME# is asserted for the first time and occurs on clock number 2. During the address phase, AD[31::00] contain a valid address and C/BE[3::0]# contain a valid bus command.

The first clock of the first data phase is clock number 3. During the data phase, C/BE# indicate which byte lanes are involved in the current data phase. A data phase may consist of wait cycles and a data transfer. The C/BE# output buffers must remain enabled (for both read and writes) from the first clock of the data phase through the end of the transaction. This ensures C/BE# are not left floating for long intervals. The C/BE# lines contain valid byte enable information during the entire data phase independent of the state of IRDY#. The C/BE# lines contain the byte enable information for data phase N+1 on the clock following the completion of the data phase N.

The first data phase on a read transaction requires a turnaround-cycle (enforced by the target via TRDY#). In this case, the address is valid on clock number 2, and then the master stops driving AD. The earliest the target can provide valid data is clock number 4. Once enabled, the output buffers must stay enabled through the end of the transaction. This ensures that the AD lines are not left floating for long intervals.

One way for a data phase to complete is when data is transferred, which occurs when both IRDY# and TRDY# are asserted on the same rising clock edge. When either IRDY# or TRDY# is deasserted, a wait cycle is inserted and no data is transferred. As shown in FIG. 4, data is successfully transferred on clock numbers 4, 6, and 8, and wait cycles are inserted on clock numbers 3, 5, and 7. The first data phase completes in the minimum time for a read transaction. The second data phase is extended on clock number 5 because TRDY# is deasserted. The last data phase is extended because IRDY# was deasserted on clock number 7.

The master knows at clock number 7 that the next data phase is the last. However, because the master is not ready to complete the last transfer (IRDY# is deasserted on clock number 7), FRAME# stays asserted. Only when IRDY# is asserted can FRAME# be deasserted as occurs on clock number 8, indicating to the target hat this is the last data phase of the transaction.

With reference now to FIG. 5, a prior art timing diagram depicts various PCI signals which occur over a PCI bus during a multiple data phase write transaction. FIG. 5 illustrates a multiple data phase write transaction as opposed to the single data phase write transaction of FIG. 2. The transaction starts when FRAME# is asserted for the first time which occurs on clock number 2. A write transaction is similar to a read transaction except no turnaround cycle is required following the address phase because the master provides both the address and data. Data phases work the same for both read and write transactions.

In FIG. 5, the first and second data phases complete with zero wait cycles. However, the third data phase has three wait cycles inserted by the target. Notice both agents insert a wait cycle on clock number 5. IRDY# must be asserted when FRAME# is deasserted indicating the last data phase.

The data transfer was delayed by the master on clock number 5 because IRDY# was deasserted. The last data phase is signaled by the master on clock number 6, but it does not complete until clock number 8.

With reference now to FIG. 6, a prior art table lists the types and encoding of PCI bus commands. The listed bus commands are specified by the PCI standard and are provided herein to show the types of high-performance and low-performance commands that are analyzed and used by the bus transaction optimizer of the present invention.

Bus commands indicate to the target the type of transaction the master is requesting. Bus commands are encoded on the C/BE[3::0]# lines during the address phase as shown in table 600. The command encodings are viewed on the bus where a "1" indicates a high voltage and "0" is a low voltage. Byte enables are asserted when "0" is present.

The Interrupt Acknowledge command is a read implicitly addressed to the system interrupt controller. The address bits are logical don't cares during the address phase and the byte enables indicate the size of the vector to be returned.

The Special Cycle command provides a simple message broadcast mechanism on PCI. It is designed to be used as an alternative to physical signals when sideband communication is necessary.

The I/O Read command is used to read data from an agent mapped in I/O Address Space. AD[31::00] provide a byte address. All 32-bits must be decoded. The byte enables indicate the size of the transfer and must be consistent with the byte address.

The I/O Write command is used to write data to an agent mapped in I/O Address Space. All 32-bits must be decoded. The byte enables indicate the size of the transfer and must be consistent with the byte address.

Reserved command encoding are reserved for future use. PCI targets must not alias reserved commands with other commands. Targets must not respond to reserved encoding. If a reserved encoding is used on the interface, the access typically will be terminated with Master-Abort.

The Memory Read command is used to read data from an agent mapped in the Memory Address Space. The target is free to do an anticipatory read of this command only if it can guarantee that such a read will have no side effects. Furthermore, the target must ensure the coherency (which includes ordering) of any data returned in temporary buffers after this PCI transaction is completed. Such buffers must be invalidated before any synchronization events (e.g., updating an I/O status register or memory flag) are passed through this access path.

The Memory Write command is used to write data to an agent mapped in the Memory Address Space. When the target returns "ready," it has assumed responsibility for the coherency (which includes ordering) of the subject data. This can be done either by implementing this command in a fully synchronous manner, or by insuring any software transparent position buffer will be flushed before synchronization events (e.g., updating an I/O status register or memory flag) are passed through this access path. This implies that the master is free to create a synchronization event immediately after using his command.

The Configuration Read command is used to read the Configuration Space of each agent. An agent is selected during a configuration access when its IDSEL signal is asserted and AD[1::0] are 00. During the address phase of a configuration cycle, AD[7::2] address one of the 64 DWORD registers (where byte enables address the byte(s) within each DWORD) in Configuration Space of each device and AD[31::11] are logical don't cares to the selected agent. AD[0::08] indicate which device of a multi-function agent is being addressed.

The Configuration Write command is used to transfer data to the Configuration Space of each agent. An agent is selected when its IDSEL signal is asserted and AD[1::0] are 00. During the address phase of a configuration cycle, the AD[7::2] lines address the 64 DWORD (where byte enables address the byte(s) within each DWORD Configuration Space of each device and AD[31::11] are logical don't cares. AD[10::08] indicate which device of a multi-function agent is being addressed.

The Memory Read Multiple command is semantically identical to the Memory Read command except that it additionally indicates that the master may intend to fetch more than one cacheline before disconnecting. The memory controller should continue pipelining memory requests as long as FRAMES# is asserted. This command is intended to be used with bulk sequential data transfers where the memory system (and the requesting master) might gain some performance advantage by sequentially reading ahead one or more additional cacheline(s) when a software transparent buffer is available for temporary storage.

The Dual Address Cycle (DAC) command is used to transfer a 64 bit address to devices that support 64 bit addressing when the address is not in the low 4GB address space. Targets that support only 32-bit addresses must treat this command as reserved and not respond to the current transaction in any way.

The Memory Read Line command is semantically identical to the Memory Read command except that it additionally indicates that the master intends to fetch a complete cacheline. This command is intended to be used with bulk sequential data transfers where the memory system (and the requesting master) might gain some performance advantage by reading up to a cacheline boundary in response to the request rather than a single memory cycle. As with the Memory Read command, prefetched buffers must be invalidated before any synchronization events are passed through this access path.

The Memory Write and Invalidate command is semantically identical to the memory Write command except that it additionally guarantees a minimum transfer of one complete cacheline; i.e., the master intends to write all bytes within the addressed cacheline in a single PCI transaction unless interrupted by the target. All byte enables must be asserted during each data phase for his command. The master may allow the transaction to cross a cacheline boundary only if it intends to transfer the entire next line also. This command requires implementation of a configuration register in the master indicating the cacheline size and may only be used with Linear Burst Ordering. It allows a memory performance optimization by invalidating a "dirty" line in a write-back cache without requiring the actual write-back cycle, thus shortening access time.

All PCI devices, except host bus bridges, are required to respond as a target to configuration, read and write, commands. All other commands are optional. For block data transfers to/from system memory, Memory Write and Invalidate, Memory Read Line and Memory Read Multiple are the recommended commands for masters capable of supporting them. The Memory Read or Memory Write commands can be used if for some reason the master is not capable of using the performance optimizing commands. For masters using the memory read commands, any length access will work for all commands; however, the preferred use is described below.

While Memory Write and Invalidate is the only command that requires implementation of the Cacheline Size register, it is strongly suggested by the PCI specification that the memory read commands use it as well. A bridge that prefetches is responsible for any latent data not consumed by the master. The simplest way for the bridge to correctly handle latent data is to simply mark it invalid at the end of the current transaction. Otherwise, it must participate in the cache coherency.

A Memory Read command should preferably be used when reading data in an address range that has side effects (not prefetchable) or a reading a single DWORD. A Memory Read Line command should preferably be used when reading more than a DWORD up to the next cacheline boundary in a prefetchable address space. A Memory Read Multiple command should preferably be used when reading a block which crosses a cacheline boundary (stay one cacheline ahead of the master if possible) of data in a prefetchable address range. The target should treat the read commands the same even though they do not address the first DWORD of the cacheline. For example, a target that is addressed at DWORD1 (instead of DWORD0) should only prefetch to the end of the current cacheline. If the Cacheline Size register is not implemented, then the master should assume a cacheline size of either 16 or 32 bytes and use the read commands recommended above.

With reference now to FIG. 7, a prior art memory map diagram shows the memory locations for specifying functional parameters within a PCI compliant device. All PCI compliant devices must support the Vendor ID, Device ID, Command, Status, Revision ID, Class Code, and Header Type fields in the header as shown in memory map 700. Implementation of the other registers in a Type 00h predefined header is optional (i.e. they can be treated as reserved registers) depending on device functionality. If a device supports the function that the register is concerned with, the device must implement it in the defined location and with the defined functionality.

The Cacheline Size register is stored at memory location 0Ch. This read/write register specifies the system cacheline size in units of 32-bit words. This register must be implemented by master devices that can generate the Memory Write and Invalidate command. The value in this register is also used by master devices to determine whether to use Read, Read Line, or Read Multiple commands for accessing memory. A device may limit the number of cacheline sizes that it can support. For example, it may accept only powers of 2 less than 128. If an unsupported value is written to the Cacheline Size register, the device should behave as if a value of 0 was written.

The Cacheline Size register may be read or written using a Configuration Read command or a Configuration Write command. The bus transaction optimizer of the present invention has access to the cacheline size through these commands.

A data transfer is quickest if completed in one transaction instead of multiple single transactions because of overhead associated with arbitrating for the PCI bus. PCI bus data transfers are quickest when high-performance bulk read/write commands are used when transferring large blocks of data to or from memory in a single PCI transaction. The high-performance bus commands for a PCI bus are shown in FIG. 6 as Memory Read Multiple, Memory Read Line, and Memory Write and Invalidate. Memory Read and Memory Write are considered low-performance commands.

There are two prerequisites which must be satisfied in order to use these high-performance bulk read/write commands: (a) the starting address for a requested bus transaction must be aligned to a cacheline boundary; and (b) the requested byte size of the bus transaction must be a multiple of the cacheline size. When both conditions (a) and (b) are satisfied, a high-performance PCI command may be used to request a data transfer in a single transaction. When both conditions are not satisfied, a low-performance command is used.

The present invention exploits the inherent speed advantage of the high-performance commands by recognizing that, in some cases, the total time for an entire data transfer may be reduced by using a high-performance command for a portion of the data transfer. The present invention analyzes each requested bus transaction for specific conditions in an attempt to optimize a data transfer by introducing a high-performance command if possible.

In order to do so, the present invention transparently uses multiple bus transactions (that include at least one high-performance bus transaction) in place of the originally requested bus transaction. In so doing, the present invention must ensure that boundary conditions are satisfied for each of the multiple bus transactions. In essence, the present invention attempts to introduce symmetry in the optimized bus transactions where no symmetry existed in the originally requested bus transaction. Although checking each requested bus transaction introduces overhead in the form of processing time, the overhead may be more than compensated by reducing the overhead of additional bus cycles associated with using only low-performance commands. In order to minimize the introduction of overhead, the present invention determines whether the requested byte size is less than a predetermined multiple transfer byte size. If so, then the conditions for optimizing the requested data transfer will not be present in the requested bus transaction, and the bus transaction optimizer of the present invention may simply pass the originally requested bus transaction through to a bus interface unit. However, when the requested byte size is greater than or equal to a predetermined multiple transfer byte size, the additional overhead of generating multiple PCI transactions is more than justified by the performance improvement obtained from using a high-performance PCI command for the longest transaction. The predetermined multiple transfer byte size will vary depending on system design and implementation and should be set by the system designer.

When the requested byte size is less than a predetermined multiple transfer byte size, the bus transaction optimizer of the present invention completes the request in one transaction using regular memory read/write commands. In this case, the additional overhead of issuing multiple PCI transactions cannot be justified owing to the small size of the data request.

When the requested byte size is greater than the predetermined multiple transfer byte size, the requested byte size may or may not be a multiple of the cacheline size, and the requested starting address may or may not be aligned with a cacheline boundary.

If the requested starting address is aligned with a cacheline boundary but the requested byte size is not a multiple of the cacheline size, the bus transaction optimizer bifurcates the original bus transaction request into two bus transaction requests. One of the newly generated bus transactions, preferably the first transaction, will satisfy both high-performance bus command conditions (a) and (b) and will make use of a high-performance bus command. The second newly generated bus transaction will satisfy condition (a) but not (b) and will hence be issued with a regular bus command.

If the requested starting address is not aligned with a cacheline boundary and the requested byte size is not a multiple of the cacheline size, the bus transaction optimizer generates two or three bus transactions depending on the value of the originally requested start address and the originally requested byte size. One of the newly generated bus transactions, preferably the first transaction, will not satisfy either high-performance bus command condition (a) or (b) and will make use of a low-performance bus command. One of the newly generated bus transactions, preferably the second transaction, will satisfy both high-performance bus command conditions (a) and (b) and will make use of a high-performance bus command. One of the newly generated bus transactions, if necessary, preferably the third transaction, will satisfy high-performance bus command conditions (a) but not (b) and will make use of a low-performance bus command.

In order to achieve the highest possible data transfer rate, the bus transaction optimizer ensures that high-performance bulk PCI memory read/write commands are issued whenever prudent and that the data transfer is completed in the least number of PCI transactions.

With reference now to FIG. 8, a block diagram depicts a PCI compliant device in which the PCI transfer optimizer of the present invention may be employed.

PCI compliant device 800 is connected to PCI bus 802 through interconnect 804. PCI compliant device 800 may be similar to PCI devices 118 shown in FIGS. 1A–1C. For example, PCI compliant device 800 may be a DMA router or a graphics device, such as a video card. PCI compliant device 800 has PCI interface unit 806 that sends and receives data to targets on PCI bus 802 using commands that have been initiated within PCI compliant device 800. Initiator 808 contains logic for generating PCI commands to send and receive data on targets on PCI bus 802. Start_Address_A 810 are signals from initiator 808 for specifying a starting address at which the data within the target may be found or retrieved. Byte_Size_A 812 are signal lines specifying the size and number of bytes of the data which is to be read or written to the target device. C/BE# 814 are signal lines for specifying the encoded PCI command to be placed on PCI bus 802.

In the preferred embodiment of the present invention, PCI transfer optimizer 816 receives Start_Address_A 810, Byte_Size_A 812, and C/BE# 814 from initiator 808. The PCI transfer optimizer may be also be termed the PCI transaction optimizer. If the present invention is applied in a generic manner to other bus architectures, the terms bus transfer optimizer or bus transaction optimizer may be used.

PCI transfer optimizer 816 analyzes signals 810–814 to determine whether the PCI command requested by initiator 808 can be optimized in some manner. If the PCI command cannot be optimized, PCI transfer optimizer 816 may pass through signals 810–814 as Start_Address_B 818, Byte_Size_B 820, and C/BE# 822 to PCI interface unit 806. During the analysis of the requested PCI command, PCI transfer optimizer 816 employs multiple transfer byte size parameter 824 and the cacheline size. The size of the cacheline is stored within PCI interface unit 806 as cacheline size register 828 as described in the PCI standard specification and shown in FIG. 7. PCI transfer optimizer 816 uses parameter 824 and inputs 810–814 to determine whether the originally requested PCI transaction can be optimized according to the method of the present invention. Other signals received and transmitted by PCI transfer optimizer 816, initiator 808, PCI compliant device 800, and PCI interface unit 806 are not shown.

With reference now to FIG. 9, a flowchart depicts the process of analyzing a PCI transaction request for optimization using high-performance PCI commands according to the present invention. The process begins when the PCI transfer optimizer receives a PCI transaction request from an initiator (step 902). A determination is made as to whether the byte size of the requested transaction is less than the multiple transfer byte size (step 904). If so, the PCI transfer optimizer does not perform any optimization on the transaction request, and the PCI transfer optimizer issues a single transaction using the PCI command in the original transaction request (step 906). In other words, the PCI transfer optimizer merely passes the original transaction request through to the PCI interface unit. Once the transaction completes, the PCI interface unit returns data to the initiator if necessary, for example, after a PCI read command (step 908).

If the byte size of the requested transaction is greater than or equal to the multiple transfer byte size, then a determination is made as to whether the start address of the requested transaction is aligned on a cacheline boundary (step 910). If not, then the requested transaction is split into two or three transactions depending on the values of the start address and the byte size of the originally requested transaction (step 912). The PCI transfer optimizer issues a first transaction using a low-performance PCI command (step 914) and then issues a second transaction using a high-performance PCI command (step 916). The PCI transfer optimizer then issues a third transaction using a low-performance PCI command if necessary (step 918). The conditions necessary for issuing a third transaction will be described in further detail with respect to FIGS. 11A–11D. Once the set of two or three transactions are completed, the PCI interface unit then returns any retrieved data to the initiator if necessary (step 908).

If it is determined in step 910 that the start address of the requested transaction is aligned on a cacheline boundary, a determination is then made as to whether the byte size of the originally requested transaction is equal to a multiple of the cacheline size (step 920). If not, then the PCI transfer optimizer splits the originally requested transaction into two transactions (step 922). The PCI transfer optimizer issues a first transaction using a high-performance PCI command (step 924) and then issues a second transaction using a low-performance PCI command (step 926). The PCI interface unit then returns data to the initiator if necessary (step 908).

If it is determined in step 920 that the byte size of the originally requested transaction is equal to a multiple of the cacheline size, then the PCI transfer optimizer issues a single transaction for the originally requested transaction using a high-performance PCI command (step 928). At this point, it has been determined that the start address of the requested transaction is aligned on a cacheline boundary and the byte size of the requested transaction is equal to a multiple of the cacheline size. Given these special conditions, a single high-performance PCI command may read or write all of the requested data with a single high-performance PCI command. Once the single transaction completes, the PCI interface unit returns the data to the initiator if necessary (step 908). The multiple transfer byte size is programmable through a register write at start-up. This value should be chosen based on the overhead in terms of PCI cycles involved in generating multiple PCI transactions to complete a data transfer versus a single PCI transaction. This value will vary depending on system design and implementation and should be set by the system designer.

Referring again to FIG. 8, PCI transfer optimizer 816 receives a PCI bus command from initiator 808 on C/BE#

814. The C/BE# signal lines provide a command in a manner shown in FIG. 6. Depending upon the start address of the requested transaction, the number of bytes specified by the byte size of the requested transaction, the cacheline size, and multiple transfer byte size parameter 824, PCI transfer optimizer 816 may split the requested transaction into two or three PCI bus transactions or may modify the specified command of the requested transaction. In certain cases, PCI transfer optimizer 816 may allow the originally requested transaction to pass through. In other cases, PCI transfer optimizer 816 will place a newly determined bus command on C/BE# 822 if necessary. PCI transfer optimizer 816 may also generate a different Start_Address_B 818 and Byte_Size_B 820 that are sent to PCI interface unit 806. If PCI transfer optimizer 816 is fetching data through the use of read commands, PCI transfer optimizer 816 may buffer the data until the entire optimized set of transactions are completed before returning the data to initiator 808. Alternatively, the data may be buffered in PCI interface unit 806. Data lines between PCI interface unit 806, PCI transfer optimizer 816, and initiator 808 are not shown in FIG. 8. The optimization logic described with respect to FIG. 9 may be implemented in PCI transfer optimizer 816 as a logic circuit, firmware or firmware-like instructions, or a combination of hardware and firmware.

With reference now to FIGS. 10A–14, block diagrams depict memory maps showing locations of requested data within the memory of targets of requested PCI commands. In these examples, a cacheline has a size of N bytes, the memory has a total of M cachelines, and the programmable multiple transfer byte size is equal to four cachelines. The examples in FIGS. 10A–14 follow the optimization logic shown in FIG. 9 to determine whether the requested PCI transaction can be optimized in any manner by the PCI transfer optimizer of the present invention.

FIG. 10A shows a requested PCI command of Memory Read with a start address of (N+2) and a byte size of (N+1). In this case, the PCI transfer optimizer determines that the requested byte size is less than the multiple transfer byte size and does not attempt to optimize the originally requested PCI transaction.

FIG. 10B shows a requested PCI command of Memory Read Line with a start address of (3N) and a byte size of (N+1). In this case, the PCI transfer optimizer has determined that the requested PCI transaction should not be optimized as the requested byte size is less than the multiple transfer byte size.

FIG. 11A shows a requested PCI command of Memory Read with a start address of (2) and a byte size of (5N). In this case, the PCI transfer optimizer determines that three PCI transactions are required for an optimal transfer data on the PCI bus since the requested byte size is greater than the multiple transfer byte size and has boundary conditions which require multiple PCI transactions. FIG. 11B shows the first optimized transaction (low-performance transaction) as a Memory Read command with a start address of (2) and a byte size of (N-2). In this first transaction, the remainder of a cacheline is read from the originally requested starting address to the next cacheline boundary. FIG. 11C shows the second optimized transaction (high-performance transaction) as a Memory Read Multiple command with a start address of (N) and a byte size of (4N). In this second transaction, multiple cachelines are read. FIG. 11D shows a third optimized transaction (low-performance transaction) as a PCI command of Memory Read with a starting address of (5N) and a byte size of (2). In this third transaction, the necessary portion of a cacheline is read from the previous cacheline boundary to the last requested byte.

FIG. 12A shows a requested Memory Read command with a starting address of (2) and a byte size of (5N-2). In this case, the PCI transfer optimizer has determined that two PCI transactions are required for an optimal transfer of data on the PCI bus. FIG. 12B shows a first optimized transaction (low-performance transaction) as a PCI command of Memory Read with a starting address of (2) and a byte size of (N-2). In this first transaction, the remainder of a cacheline is read from the originally requested starting address to the next cacheline boundary. FIG. 12C shows a second optimized transaction (high-performance transaction) as a PCI command of Memory Read Multiple with a starting address of (N) and a byte size of (4N). In this second transaction, multiple cachelines are read. Since the last byte of the original request coincides with a cacheline boundary, a third optimized transaction is not necessary.

FIG. 13A shows a requested PCI command of Memory Read with a starting address of (N) and a byte size of (4N+2). In this case, the PCI transfer optimizer has determined that two PCI transactions are required for an optimal transfer of data. FIG. 13B shows a first optimized transaction (high-performance transaction) as a PCI command of Memory Read Multiple with a starting address of (N) and a byte size of (4N). In this first transaction, multiple cachelines are read. Since the first byte of the original request coincides with a cacheline boundary, a low-performance transaction is not necessary to handle the bytes preceding a cacheline boundary. FIG. 13C shows a second optimized transaction (low-performance transaction) as a PCI command of Memory Read with a starting address of (5N) and a byte size of (2). In this second transaction, the remainder of a cacheline is read from the preceding cacheline boundary to the last byte of the originally requested transaction.

FIG. 14 shows a requested PCI command of Memory Read with a starting address of (N) and a byte size of (5N). In this case, the PCI transfer optimizer determines that the requested byte size is larger than the multiple transfer byte size. Moreover, the starting address of the requested transaction is aligned on a cacheline boundary and the byte size of the requested transaction is equal to a multiple of the cacheline size. Therefore, the PCI transfer optimizer issues a single, high-performance transaction using Memory Read Multiple in order to optimize the requested transaction by reading multiple cachelines. If the originally requested PCI command had been a Memory Read Multiple, then the PCI transfer optimizer would have merely passed the original PCI command without modification.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the preferred embodiment of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A method for processing bus transactions comprising the steps of:
   receiving an original bus transaction request; and
   in response to receiving the original bus transaction request, generating a plurality of bus transaction requests, wherein the plurality of bus transaction requests comprise at least one high-performance bus transaction request and at least one low-performance bus transaction request.

2. The method of claim 1 wherein a high-performance bus command transfers at least one cacheline of data.

3. The method of claim 1 wherein the original bus transaction request comprises:
   an original start address of a target memory for the original bus transaction;
   an original byte size for a number of bytes for the original bus transaction; and
   an original bus command for the original bus transaction.

4. The method of claim 3 wherein the plurality of bus transaction requests are generated in response to a determination that the original byte size is greater than or equal to a predetermined multiple transfer byte size data value.

5. The method of claim 3 wherein the plurality of bus transaction requests comprise a first low-performance bus transaction request with a first optimized start address equal to the original start address and a high-performance bus transaction request with a second optimized start address equal to a cacheline boundary succeeding the original start address.

6. The method of claim 5 wherein the plurality of bus transaction requests are generated in response to a determination that the original start address is not aligned on a cacheline boundary.

7. The method of claim 5 wherein the first low-performance bus transaction request has a first optimized byte size equal to a remainder of a cacheline and the high-performance bus transaction request has a second optimized byte size equal to a plurality of cachelines.

8. The method of claim 5 further comprising generating a second low-performance bus transaction request with a third optimized start address equal to a cacheline boundary succeeding a cacheline transferred in the high-performance bus transaction request and a third optimized byte size equal to a remainder of a cacheline.

9. The method of claim 3 wherein the plurality of bus transaction requests comprise a high-performance bus transaction request with a first optimized start address equal to the original start address and a low-performance bus transaction request with a second optimized start address equal to a cacheline boundary succeeding a cacheline transferred in the high-performance bus transaction request.

10. The method of claim 9 wherein the plurality of bus transaction requests are generated in response to a determination that the original start address is aligned on a cacheline boundary.

11. The method of claim 9 wherein the high-performance bus transaction request has a first optimized byte size equal to a plurality of cachelines and the low-performance bus transaction request has a second optimized byte size equal to a remainder of a cacheline.

12. A method for processing bus transactions comprising the steps of:
   receiving an original bus transaction request, wherein the original bus transaction request comprises:
   an original start address of a target memory for the original bus transaction;
   an original byte size for a number of bytes for the original bus transaction;
   an original bus command for the original bus transaction; and
   in response to receiving the original bus transaction request, generating a plurality of bus transaction requests in response to a determination that the original byte size is greater than or equal to a predetermined multiple transfer byte size data value, wherein the plurality of bus transaction requests comprise at least one high-performance bus transaction request and at least one low-performance bus transaction request.

13. The method of claim 12 wherein the plurality of bus transaction requests are generated in response to a determination that the original start address is not aligned on a cacheline boundary, and wherein the plurality of bus transaction requests comprise a first low-performance bus transaction request with a first optimized start address equal to the original start address and a high-performance bus transaction request with a second optimized start address equal to a cacheline boundary succeeding the original start address.

14. The method of claim 13 wherein the first low-performance bus transaction request has a first optimized byte size equal to a remainder of a cacheline and the high-performance bus transaction request has a second optimized byte size equal to a plurality of cachelines.

15. The method of claim 13 further comprising generating a second low-performance bus transaction request with a third optimized start address equal to a cacheline boundary succeeding a cacheline transferred in the high-performance bus transaction request and a third optimized byte size equal to a remainder of a cacheline.

16. The method of claim 12 wherein the plurality of bus transaction requests are generated in response to a determination that the original start address is aligned on a cacheline boundary, and wherein the plurality of bus transaction requests comprise a high-performance bus transaction request with a first optimized start address equal to the original start address and a low-performance bus transaction request with a second optimized start address equal to a cacheline boundary succeeding a cacheline transferred in the high-performance bus transaction request.

17. The method of claim 16 wherein the high-performance bus transaction request has a first optimized byte size equal to a plurality of cachelines and the low-performance bus transaction request has a second optimized byte size equal to a remainder of a cacheline.

18. A data processing system comprising:
   a central processing unit;
   a memory subsystem;
   a bus for receiving bus transactions for transferring data;
   a device connected to the bus, the device comprising:
      a bus transaction initiator, wherein the bus transaction initiator generates a bus transaction request;
      a bus transaction optimizer, wherein the bus transaction optimizer generates a plurality of bus transaction requests in response to receiving an original bus transaction request, and wherein the plurality of bus transaction requests comprise at least one high-performance bus transaction request and at least one low-performance bus transaction request; and
      a bus interface unit, wherein the bus interface unit controls a bus transaction in response to receiving a bus transaction request.

19. A data processing device comprising:
   a bus transaction initiator, wherein the bus transaction initiator generates a bus transaction request;
   a bus transaction optimizer, wherein the bus transaction optimizer generates a plurality of bus transaction requests in response to receiving an original bus transaction request, and wherein the plurality of bus transaction requests comprise at least one high-performance bus transaction request and at least one low-performance bus transaction request; and a bus interface unit, wherein the bus interface unit controls a bus transaction in response to receiving a bus transaction request.

20. The data processing device of claim 19 wherein the bus transaction optimizer further comprises a predetermined multiple transfer byte size data value, wherein the original bus transaction request comprises an original byte size for a number of bytes for the original bus transaction, and wherein the bus transaction optimizer attempts to optimize the bus transaction in response to a determination that the original byte size is greater than or equal to the multiple transfer byte size data value.

21. The data processing device of claim 20 wherein the bus transaction optimizer generates a low-performance bus transaction request with a first optimized start address and a high-performance bus transaction request with a second optimized start address.

22. A data processing device comprising:

a bus transaction initiator;

a bus transaction optimizer; and

A bus interface unit, wherein the bus transaction optimizer generates at least one high-performance bus transaction request and at least one low-performance bus transaction request in response to receiving an original bus transaction request.

23. The data processing device of claim 22 wherein the bus interface unit controls a bus transaction in response to receiving a bus transaction request.

24. The data processing device of claim 22 wherein the bus transaction initiator generates a bus transaction request.

25. The data processing device of claim 22 wherein a high-performance bus command transfers at least one cacheline of data.

26. The data processing device of claim 22 wherein the original bus transaction request comprises:

an original start address of a target memory for the original bus transaction;

an original byte size for a number of bytes for the original bus transaction; and an original bus command for the original bus transaction.

27. The data processing device of claim 26 wherein the bus transaction optimizer comprises a predetermined multiple transfer byte size data value, and wherein the bus transaction optimizer attempts to optimize the bus transaction in response to a determination that the original byte size is greater than or equal to the multiple transfer byte size data value.

28. The data processing device of claim 26 wherein the bus transaction optimizer generates a first low-performance bus transaction request with a first optimized start address equal to the original start address and a high-performance bus transaction request with a second optimized start address equal to a cacheline boundary succeeding the original start address.

29. The data processing device of claim 28 wherein the bus transaction optimizer optimizes the bus transaction in response to a determination that the original start address is not aligned on a cacheline boundary.

30. The data processing device of claim 28 wherein the first low-performance bus transaction request has a first optimized byte size equal to a remainder of a cacheline and the high-performance bus transaction request has a second optimized byte size equal to a plurality of cachelines.

31. The data processing device of claim 28 wherein the bus transaction optimizer generates a second low-performance bus transaction request with a third optimized start address equal to a cacheline boundary succeeding a cacheline transferred in the high-performance bus transaction request and a third optimized byte size equal to a remainder of a cacheline.

32. The data processing device of claim 26 wherein the bus transaction optimizer generates a high-performance bus transaction request with a first optimized start address equal to the original start address and a low-performance bus transaction request with a second optimized start address equal to a cacheline boundary succeeding a cacheline transferred in the high-performance bus transaction request.

33. The data processing device of claim 32 wherein the bus transaction optimizer optimizes the bus transaction in response to a determination that the original start address is aligned on a cacheline boundary.

34. The data processing device of claim 32 wherein the high-performance bus transaction request has a first optimized byte size equal to a plurality of cachelines and the low-performance bus transaction request has a second optimized byte size equal to a remainder of a cacheline.

35. A data processing device comprising:

a signal path for receiving an input bus transaction request from a bus transaction initiator, wherein the input bus transaction request comprises:

an input start address of a target memory;

an input byte size for a number of bytes; and an input bus command;

a bus transaction optimizer, wherein the bus transaction optimizer generates a plurality of output bus transaction requests in response to receiving an input bus transaction request, and wherein the plurality of output bus transaction requests comprise at least one high-performance bus transaction request and at least one low performance bus transaction request; and a signal path for sending an output bus transaction request to a bus interface unit, wherein the output bus transaction request comprises:

an output start address of a target memory;

an output byte size for a number of bytes; and an output bus command.

36. A computer program product on a computer readable medium for use in a data processing system for processing bus transactions, the computer program product comprising:

first instructions for receiving an original bus transaction request, wherein the original bus transaction request comprises:

an original start address of a target memory for the original bus transaction;

an original byte size for a number of bytes for the original bus transaction;

an original bus command for the original bus transaction; and second instructions for generating, in response to receiving the original bus transaction request, a plurality of bus transaction requests in response to a determination that the original byte size is greater than or equal to a predetermined multiple transfer byte size data value, wherein the plurality of bus transaction requests comprise at least one high-performance bus transaction request and at least one low performance bus transaction request.

* * * * *